US012517009B2

United States Patent
Loyola et al.

(10) Patent No.: US 12,517,009 B2
(45) Date of Patent: Jan. 6, 2026

(54) ALIGNMENT ASSESSMENT FOR HEAD-MOUNTED DISPLAY SYSTEM

(71) Applicant: Microsoft Technology Licensing, LLC, Redmond, WA (US)

(72) Inventors: Bryan Richard Loyola, San Jose, CA (US); Rayna Demaster-Smith, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 818 days.

(21) Appl. No.: 17/663,189

(22) Filed: May 12, 2022

(65) Prior Publication Data

US 2023/0366780 A1 Nov. 16, 2023

(51) Int. Cl.
*G01M 11/00* (2006.01)
*G01J 1/04* (2006.01)
*G02B 27/01* (2006.01)

(52) U.S. Cl.
CPC ......... *G01M 11/335* (2013.01); *G01J 1/0407* (2013.01); *G02B 27/0172* (2013.01); *G02B 27/0179* (2013.01); *G02B 2027/0138* (2013.01); *G02B 2027/0178* (2013.01); *G02B 2027/0181* (2013.01)

(58) Field of Classification Search
CPC ........ G02B 27/0172; G02B 2707/0138; G02B 2707/0178; G02B 2707/0181
USPC ....................................................... 359/630
See application file for complete search history.

(56) References Cited

U.S. PATENT DOCUMENTS

| 12,174,391 B2 * | 12/2024 | Patton ............... G02B 27/0172 |
| 2005/0002609 A1 | 1/2005 | Bylander |
| 2017/0295362 A1 | 10/2017 | Travis |
| 2018/0098056 A1 | 4/2018 | Bohn |
| 2018/0338122 A1 | 11/2018 | Travis |
| 2021/0165222 A1 | 6/2021 | Jarvenpaa |

FOREIGN PATENT DOCUMENTS

| EP | 2696182 A1 * | 2/2014 | ............ G01D 5/266 |
| JP | 2018060011 A | 4/2018 | |
| WO | 2022046814 A2 | 3/2022 | |

OTHER PUBLICATIONS

"International Search Report and Written Opinion Issued in PCT Application No. PCT/US2023/013447", Mailed Date: Jun. 23, 2023, 13 Pages.

* cited by examiner

*Primary Examiner* — Jerry L Brooks
(74) *Attorney, Agent, or Firm* — Alleman Hall & Tuttle LLP

(57) ABSTRACT

A head-mounted display system includes a wearable frame assembly and a display assembly mounted to the wearable frame assembly and configured to provide display light for viewing by a user eye. A camera mounted to the wearable frame assembly is configured to image a surrounding real-world environment. One or more strain gauges each have one or more variable strain parameters based at least in part on an amount of strain applied to the head-mounted display system. A logic machine is configured to assess an alignment of one or both of the display assembly and the camera based at least in part on the one or more strain parameters for each strain gauge of the one or more strain gauges.

20 Claims, 15 Drawing Sheets

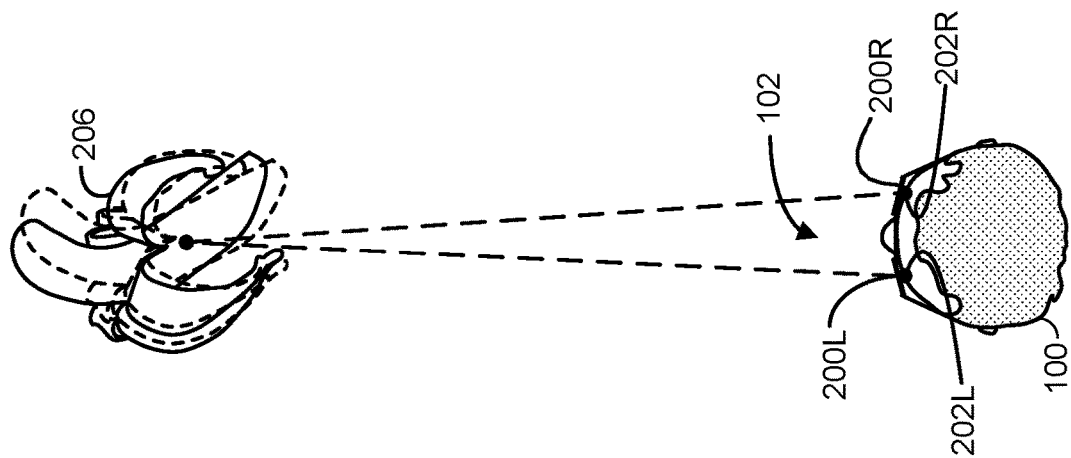
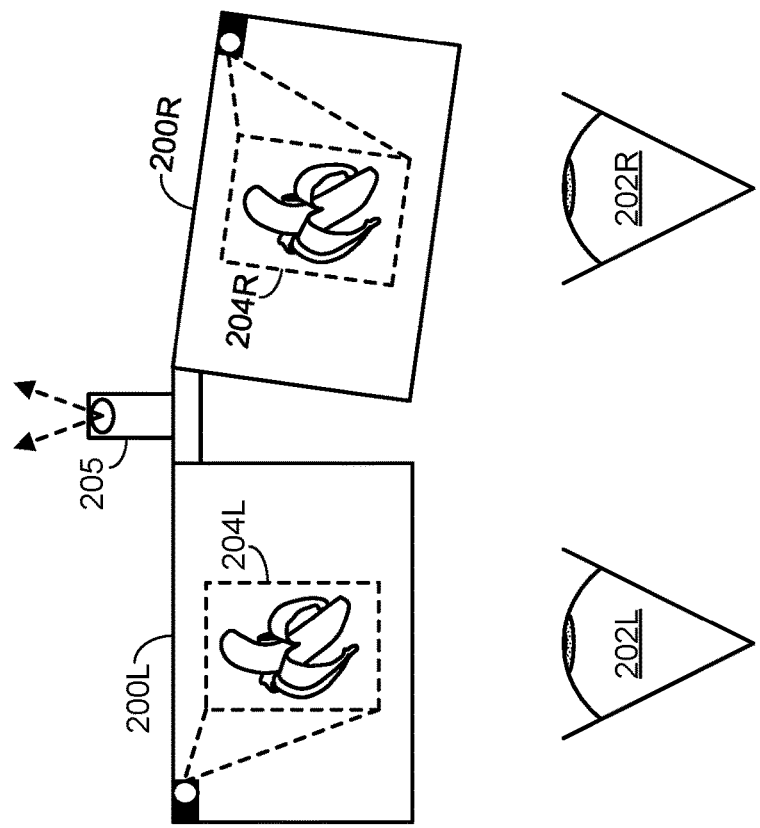
FIG. 3B
FIG. 3A

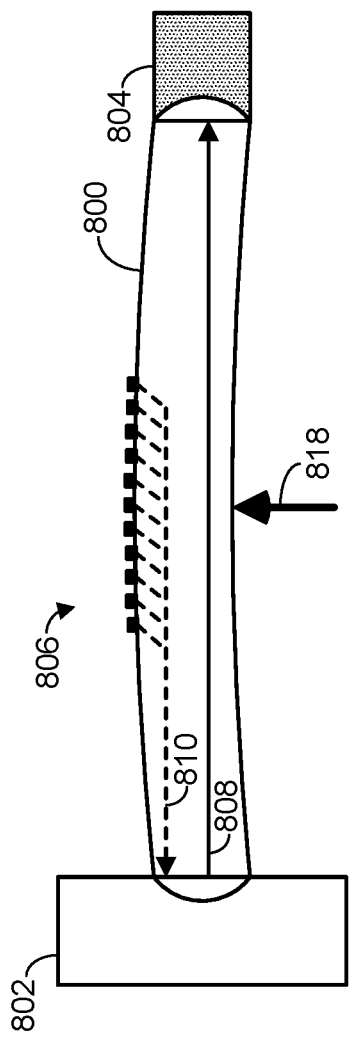
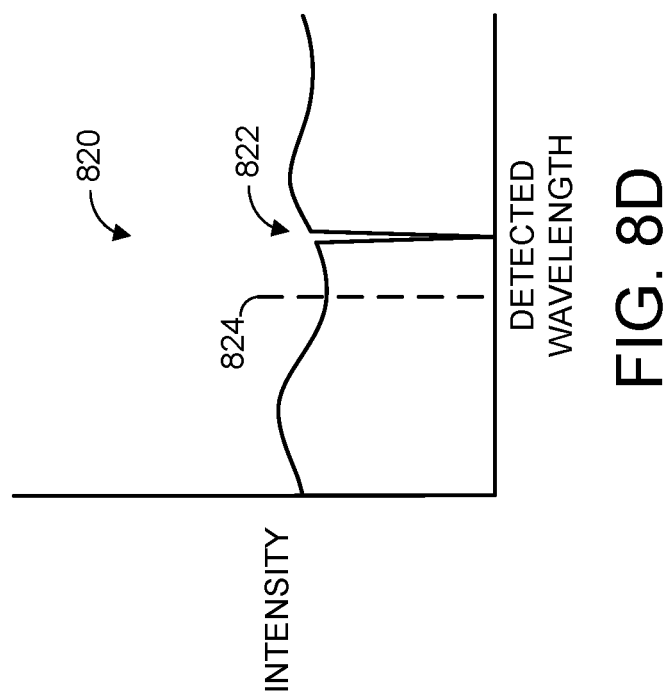
FIG. 8C
FIG. 8D

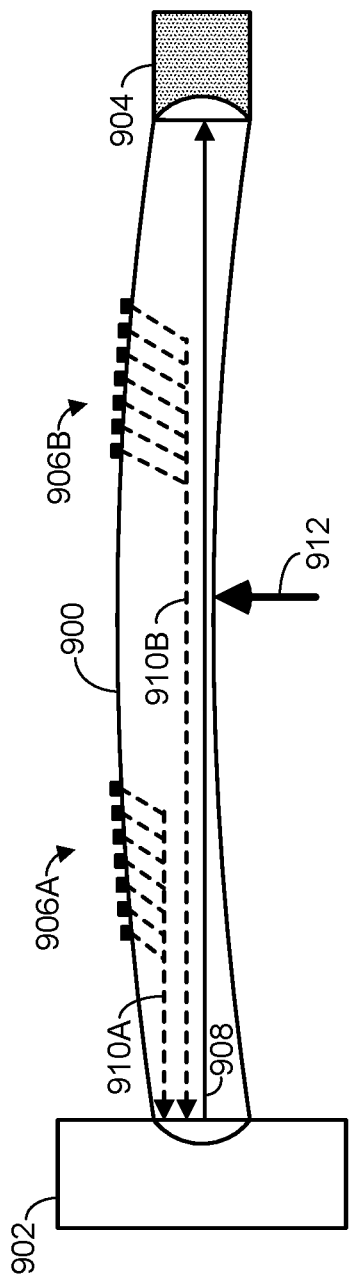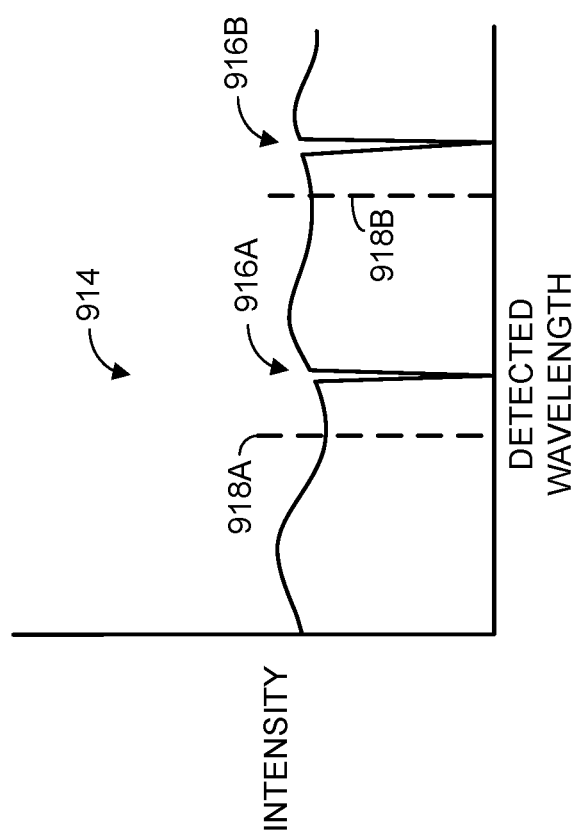
FIG. 9A
FIG. 9B

ALIGNMENT ASSESSMENT FOR HEAD-MOUNTED DISPLAY SYSTEM

BACKGROUND

Head-mounted display systems emit display light to form display images for viewing by a user's eyes. The position, orientation, and/or size at which a display image is presented on a display element (e.g., near-eye display) of the head-mounted display system may in some cases be varied based on a pose of the head-mounted display system relative to a surrounding real-world environment (e.g., a six degree-of-freedom position and orientation of the head-mounted display system). For instance, displayed images may create the appearance of a virtual object that appears to have a fixed position and orientation relative to a surrounding real or virtualized environment, even as the position and orientation of the head-mounted display change.

The pose of the head-mounted display system may in some cases be estimated based at least in part on one or more images of the real-world environment captured by an on-board world-facing camera. However, if the display element and the world-facing camera are out of alignment with one another, the display imagery may be presented with a position, orientation, and/or size that is inconsistent with the actual pose of the head-mounted display system—e.g., if the display is crooked relative to the camera, the displayed imagery may appear crooked from a user's perspective. Similarly, in cases where the head-mounted display includes two or more different displays (e.g., left and right near-eye displays corresponding to the user's left and right eyes), misalignment between the displays and/or between one display and the camera can affect presentation of display imagery in an undesirable way.

One potential source of misalignment occurs when a frame or other aspect of the head-mounted display system flexes, bends, or otherwise moves out of a calibrated state.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A head-mounted display system includes a wearable frame assembly and a display assembly mounted to the wearable frame assembly and configured to provide display light for viewing by a user eye. A camera mounted to the wearable frame assembly is configured to image a surrounding real-world environment. A plurality of strain gauges each have one or more variable strain parameters based at least in part on an amount of strain applied to the head-mounted display system. A logic machine is configured to assess an alignment of one or both of the display assembly and the camera based at least in part on the one or more strain parameters for each strain gauge of the plurality of strain gauges.

BRIEF DESCRIPTION OF THE DRAWINGS

FIGS. 3A and 3B schematically illustrate an example misalignment of a head-mounted display system.

FIGS. 8A-D schematically illustrate return of a portion of test light by a Bragg grating of an optical element.

FIGS. 9A and 9B schematically illustrate return of a portion of test light by first and second Bragg gratings of an optical element.

DETAILED DESCRIPTION

The present disclosure is directed to techniques for assessing the alignment of one or more components of a head-mounted display system (HMD)—e.g., detecting misalignments that may affect presentation of display imagery. As used herein, a "misalignment" generally refers to any scenario where the position and/or orientation of a display assembly and/or a camera of an HMD differs from a previously calibrated alignment. The previously calibrated alignment may be set during factory calibration and/or via a calibration routine performed by an end user, as examples. The calibrated alignment may be compromised due to application of external strain, which can cause portions of the HMD to become misaligned with one another by bending, flexing, and/or otherwise moving.

Accordingly, the present disclosure describes techniques and structures for an HMD that enable the alignment of one or both of the display assembly and the camera to be assessed (e.g., with reference to a calibrated state). In general, the HMD includes one or more strain gauges, each having one or more variable strain parameters that are affected by an amount of strain applied to the HMD. The changing strain parameters of the one or more strain gauges may be detected and used by a logic machine to assess the alignment of the HMD—e.g., the alignment of one or both of the display assembly and the camera relative to a previously-calibrated state. In some cases, the logic machine may vary one or more aspects of a display image (e.g., display-space position, orientation, and/or size) based on the assessed alignment of the display assembly and/or camera. For example, upon determining that application of strain has likely caused the display assembly to become crooked relative to the camera, the orientation of the display image may be correspondingly changed.

The structures and techniques described herein may beneficially enable detection of HMD misalignment in a manner that is simpler, easier to manufacture, and more cost-effective than other approaches, such as approaches that make use of a relatively large and/or complex optical combiner positioned at or near a nose bridge of the head-mounted display system. Furthermore, it is believed that the herein-disclosed structures and corresponding techniques allow for a head-mounted display system with a desirable form factor because there is no need for an optical combiner at the conspicuous position in the middle of the user's face.

Figure 1:
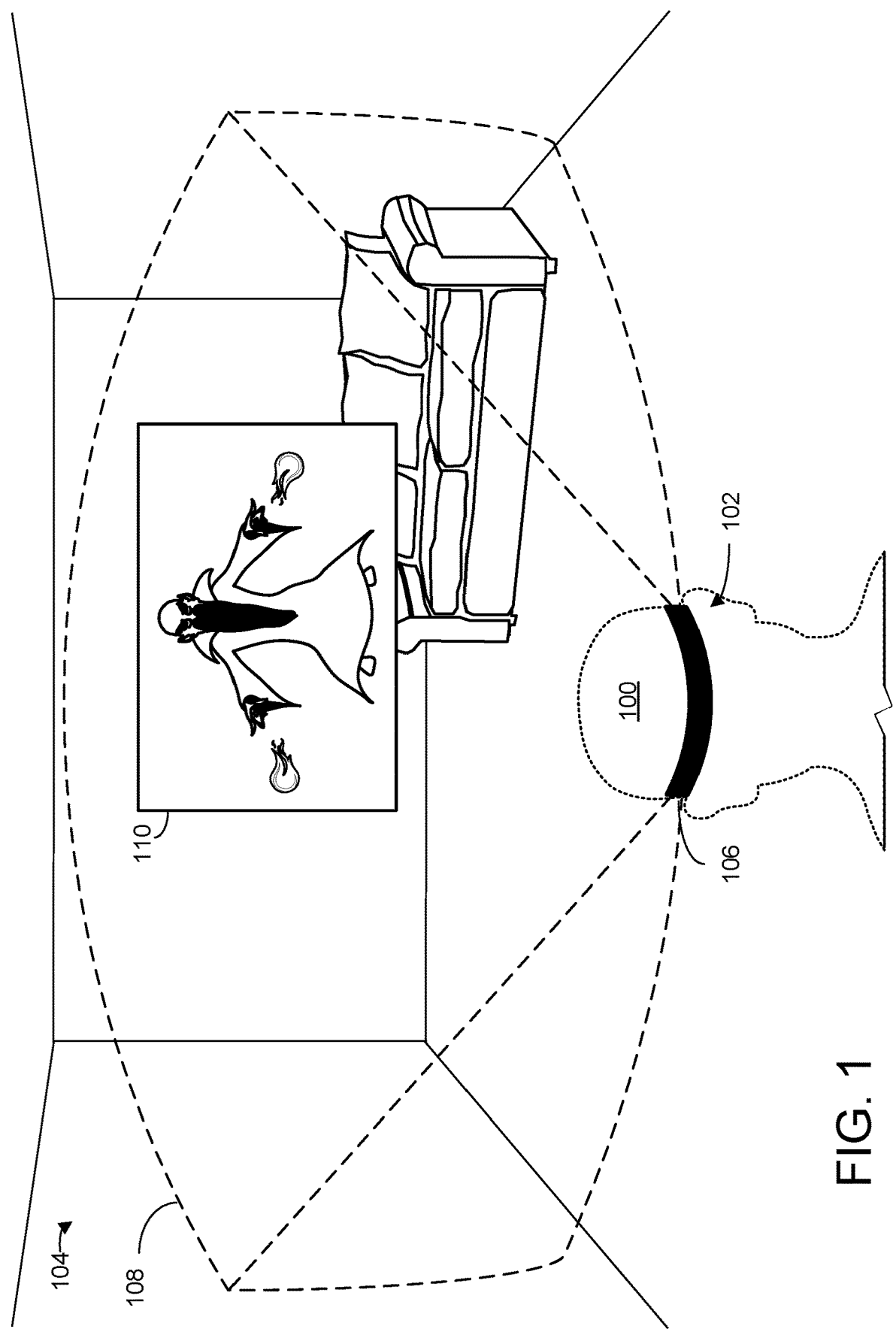
FIG. 1 schematically illustrates use of an example head-mounted display system.

FIG. 1 schematically illustrates use of a head-mounted display system. Specifically, FIG. 1 schematically depicts a user 100 wearing an HMD 102 and viewing a surrounding real-world environment 104. HMD 102 includes one or more display assemblies 106 configured to present computer-generated imagery to eyes of the user, as will be described below. FIG. 1 also shows a field of view (FOV) 108 indicating an area in which the display assemblies can present display imagery that will be visible to the user.

Head-mounted display system 102 may be used to view and interact with computer-rendered display imagery. In the example of FIG. 1, the HMD is presenting a display image 110, taking the form of a virtual wizard character that is not present in the user's real-world environment. Such virtual imagery may be presented as a series of digital image frames by the one or more display assemblies, where the image frames are dynamically updated over time—e.g., based on changes in an underlying software application, and/or as a position/orientation of the HMD changes.

Display imagery presented by the HMD may be rendered by any suitable computer logic componentry. Such logic componentry may be on-board, and/or at least some rendering of display imagery may be outsourced to an off-board computing device—e.g., collocated in a same real-world environment as the head-mounted display system, or streamed over a suitable computer network. In general, the computer logic componentry that renders the display imagery may have any suitable capabilities, hardware configuration, and form factor. In some cases, such logic componentry may be implemented as a logic machine as described below with respect to FIG. 13. The head-mounted display system may in some cases be implemented as computing system 1300 shown in FIG. 13.

Head-mounted display system 102 may be an augmented reality computing device that allows user 100 to directly view real world environment 104 through one or more displays that are at least partially transparent. Alternatively, the one or more displays may be fully opaque and either present imagery of a real-world environment as captured by a front-facing camera, or present a fully virtual surrounding environment while blocking the user's view of the real world. To avoid repetition, experiences provided by both implementations are referred to as "virtual reality," and the computing devices used to provide the augmented or purely virtualized experiences are referred to as head-mounted display systems.

As discussed above, the HMD may present display imagery via one or more display assemblies. The present disclosure primarily focuses on an example where the HMD includes two different display assemblies, implemented as two near-eye displays—e.g., one for each user eye. However, it will be understood that other suitable display arrangements may instead be used—e.g., a single display assembly configured to present display images that are visible to both user eyes.

Figure 2B:
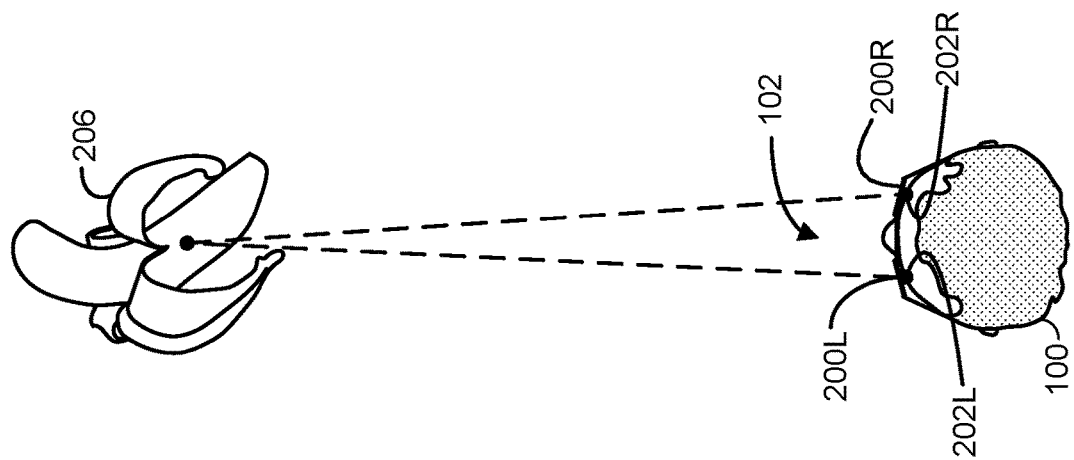
FIGS. 2A and 2B schematically illustrate presentation of display imagery to user eyes via a head-mounted display system.
Figure 2A:
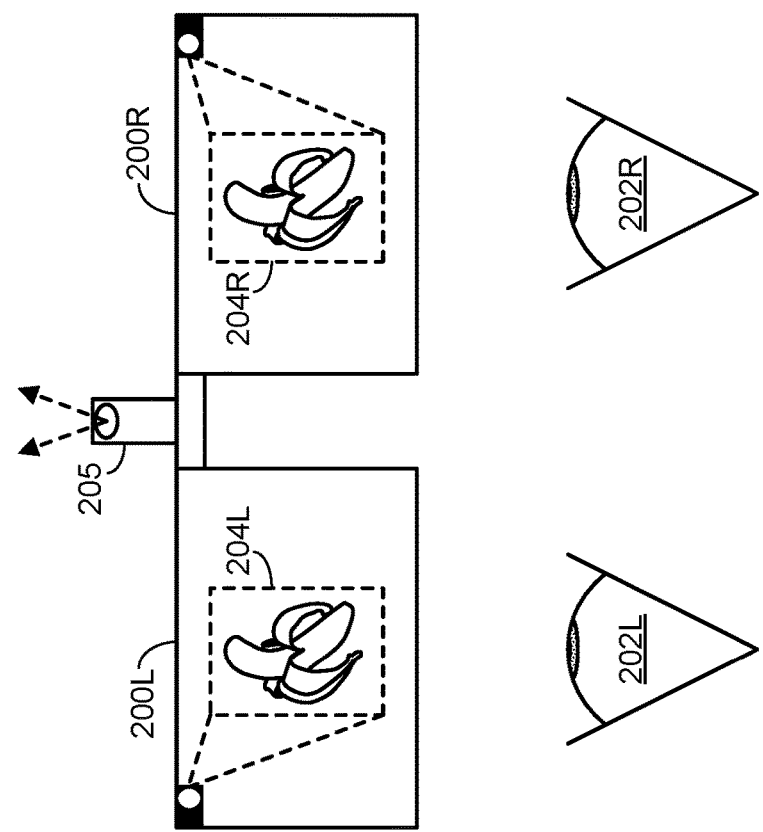

FIGS. 2A and 2B schematically illustrate an example where left and right images are presented at respective left and right near-eye displays of an HMD. In this manner, the HMD may create the impression in the user's brain that the two images correspond to a single three-dimensional virtual object. By controlling the sizes and positions of the left and right display images, the HMD may control the world-space position that the virtual object appears to occupy (e.g., the object's apparent three-dimensional position relative to the user).

Specifically, FIGS. 2A and 2B schematically show two near-eye displays 200L and 200R of a head-mounted display system. Other components of the head-mounted display system are omitted for simplicity's sake. As shown, left near-eye display 200L is positioned in front of a left user eye 202L, and presents a left display image 204L for viewing by the left user eye. Right near-eye display 200R is positioned in front of a right user eye 202R and presents a right display image 204R for viewing by the right user eye. In this nonlimiting example, the display images correspond to a banana.

In FIG. 2A, the HMD also includes a world-facing camera 205 configured to capture images of a surrounding real-world environment. As discussed above, the logic machine of the HMD may in some cases be configured to assess a pose (e.g., a six degree-of-freedom position and orientation) of the HMD relative to the surrounding real-world environment based on the images captured by the camera and/or other sources of information (e.g., an inertial measurement unit including one or more accelerometers, gyroscopes, and/or magnetometers). Pose estimation may be done based on any suitable image-based pose estimation technique. For example, the logic machine may detect correspondences between pixels of the captured images and recognized landmarks having previously-known and/or assessed three-dimensional positions within the real-world environment. Thus, the pose of the HMD may be estimated based at least in part on the apparent positions, orientations, and sizes of the recognized landmarks within the images captured by the camera.

FIG. 2B schematically shows an overhead view of user 100, with near-eye displays 200L and 200R still positioned in front of user eyes 202L and 202R. FIG. 2B additionally shows a virtual object 206 having an apparent world-space position that is spaced in front of the user. In other words, FIG. 2B illustrates how the user's brain interprets left image 204L and right image 204R as a single three-dimensional virtual object 206.

As discussed above, the manner in which the left and right images are displayed (e.g., the relative positions, sizes, and orientations of the images on the one or more display assemblies) may be dynamically set to control the apparent world-space position of the virtual object. For example, as the pose of the HMD changes (e.g., due to the user moving through the real-world environment), presentation of the display images may be varied in a manner that creates the impression the virtual object is maintaining a fixed position and orientation (i.e., world locked) relative to a frame-of-reference, such as the real-world environment or the HMD.

However, as discussed above, misalignments in the head-mounted display system can interfere with the viewing experience. More particularly, a misalignment between a camera and a display assembly, and/or between one display assembly and another, can cause the displayed imagery to appear to have the incorrect position, size, and/or orientation. For example, if the camera is crooked relative to the display assembly, the pose of the HMD estimated based on images captured by the camera may be incorrect, causing the displayed imagery to appear to be crooked from the user's perspective. Similarly, if a display assembly is out of alignment with respect to the camera, the alignment of the display assembly will not be consistent with the pose of the HMD estimated based on the camera images, which can also interfere with the displayed imagery. Further still, misalignments may result in stereo disparity in which left and right images are not properly aligned with one another, thus causing an uncomfortable viewing experience.

FIGS. 3A and 3B schematically illustrate a scenario where components of the head-mounted display system are misaligned. Specifically, FIG. 3A again schematically depicts near-eye displays 200L and 200R positioned in front of user eyes 202L and 202R while presenting display images 204L and 204R. However, in this example, right near-eye display 200R is misaligned relative to left near-eye display 200L and relative to camera 205. Specifically, the right near-eye display is offset by approximately 10°. As such, in FIG. 3B, the alignment of right near-eye display 200R is inconsistent with the pose of the HMD as estimated based on images captured by the camera, and display image 204R is out of alignment with display image 204L. As such, the two display images do not resolve to a single three-dimensional object 206, but rather are perceived as two different offset images. This can be distracting at best, and at worst, can cause discomfort and feelings of sickness for the user.

Figure 4:
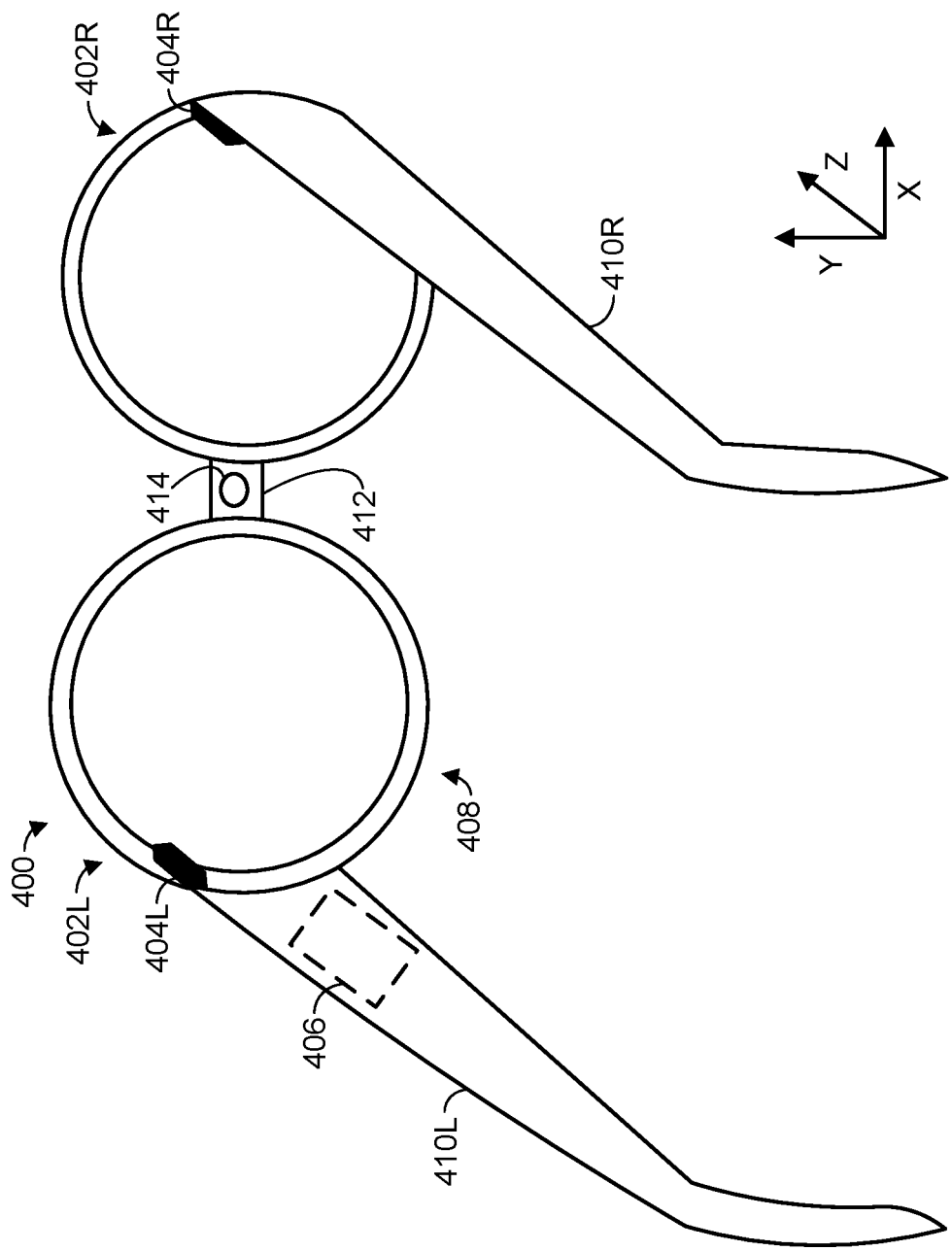
FIG. 4 schematically depicts an example head-mounted display system.

Accordingly, FIG. 4 schematically illustrates an example head-mounted display system 400. It will be understood that the specific appearance and physical configuration of head-mounted display system 400 are greatly simplified for ease of understanding and are in no way limiting. In general, the techniques and structures described herein may be used with a wide variety of different suitable devices, which may differ from head-mounted display system 400 in any number of suitable ways.

As shown, head-mounted display system 400 includes a left display assembly 402L, which includes a left light source 404L. Similarly, HMD 400 includes a right display assembly 402R, which in turn includes a right light source 404R. Each display assembly may be configured to present display light for viewing by a respective user eye. As used herein, the light sources are described as being components of their respective display assemblies. Thus, a display assembly "presenting" or "providing" display light for viewing by a user eye may include the light source emitting display light, which is propagated toward a respective eyebox via suitable optical elements of the display assembly (e.g., a waveguide having suitable incoupling and outcoupling gratings). For example, light source 404L may emit display light toward a left eyebox, and light source 404R may emit display light toward a right eyebox.

In the example of FIG. 4, the left and right display assemblies are generally circular in shape. It will be understood that this is a non-limiting example. In general, each display assembly may have any suitable regular or irregular shape, provided that they are each useable for providing display light to an eyebox for viewing by a user eye. Furthermore, the left and right display assemblies need not each have the same shape.

As will be described in more detail below, each display assembly may include a suitable optical element, such as a waveguide, configured to incouple display light from the light source and outcouple the display light for viewing by a user eye at an eyebox. The left- and right-side display light provided by the left and right display assemblies may form respective left and right display images, as discussed above. Each display assembly may use any suitable image-forming technology for controlling emission of display light, such that the display light forms the display image at the eyebox. In one example, the light sources associated with the left display assembly and/or the right display assembly may include liquid crystal on silicon (LCOS) displays, where light is polarized and reflected off a plurality of pixels of a dynamically controllable liquid crystal layer. In another example, the light sources associated with the left display assembly and/or the right display assembly may include microoptoelectromechanical system (MOEMS) projector displays, where light is reflected off one or more micromirrors.

Regardless of the specific image-forming technology used by the display assemblies, operation of the display assemblies to provide spatially modulated display light for forming display images may be controlled by a logic machine, such as logic machine 406 schematically shown in FIG. 4. For example, the logic machine may control the light source associated with each display assembly to cause the emitted display light to form an image at the eyebox. The logic machine may additionally, or alternatively, detect misalignments between various components of the head-mounted display system—e.g., the alignment of one or both of a display assembly and a camera.

It will be understood that the specific position of the logic machine with respect to the rest of head-mounted display system 400 is not limiting, and is used only for the sake of example. The logic machine may take the form of any suitable computer logic componentry, such as a suitable processor or application-specific integrated circuit (ASIC). In some cases, the logic machine may render images for presentation by the display assemblies, and send control inputs to the respective light sources that cause the display assemblies to provide corresponding display light. In other examples, some to all rendering of display images may be performed by a separate logic component (e.g., on-board or off-board the head-mounted display system). In some examples, logic machine 406 may be implemented as described below with respect to FIG. 13.

In the example of FIG. 4, the head-mounted display assembly includes a wearable frame assembly 408. This includes circular frames surrounding left display assembly 402L and right display assembly 402R, a left temple support 410L, a right temple support 410R, and a bridge support 412. Left display assembly 402L is mounted to a left side of the wearable frame assembly (e.g., left of bridge support 412), while right display assembly 402R is mounted to a right side of the wearable frame assembly (e.g., right of bridge support 412). More particularly, in this example, left display assembly 404L is coupled to left temple support 410L, while right display assembly 404R is coupled to right temple support 410R.

In this example, the wearable frame assembly is similar to the frame of a conventional pair of eyeglasses—e.g., two separate temple supports that, when worn, support the head-mounted display system through contact with the user's temples and/or ears. However, as discussed above, it will be understood that the specific configuration of head-mounted display system 400 shown in FIG. 4 is non-limiting and serves as only one simplified example. In other examples, the wearable frame assembly may take other suitable forms—e.g., the wearable frame assembly may include a headband that wraps around the wearer's head, rather than two separate temple supports, or the wearable frame assembly may include a helmet supporting a display with a visor form factor.

Furthermore, HMD 400 includes a world-facing camera 414. The world-facing camera is mounted to the wearable frame assembly—specifically, to bridge support 412. However, it will be understood that the camera may have any suitable position with respect to other components of the HMD. As discussed above, the camera may be configured to capture one or more images of a surrounding real-world environment, and logic machine 406 may be configured to estimate a pose of the HMD based at least in part on the images captured by the camera. The camera may take any suitable form, including an image sensor sensitive to any suitable wavelengths of light (e.g., visible light and/or infrared light). In some cases, the camera may be implemented as a depth camera—e.g., a time-of-flight (TOF) depth camera or a structured light depth camera. In some cases, the HMD may include two or more cameras—e.g., two cameras arranged as a stereoscopic pair.

As indicated above, various structures of head-mounted display system 400 are useable to assess the alignment of components of the HMD. In general, the HMD may include one or more strain gauges, each strain gauge having one or more variable strain parameters based at least in part on an amount of strain applied to the HMD. The present disclosure primarily describes examples where the one or more strain gauges take the form of one or more Bragg gratings etched into an optical element. However, it will be understood that a Bragg grating on an optical element is one non-limiting example of a suitable strain gauge that may be used according to the techniques described herein.

As another non-limiting example, the strain gauges may include foil strain gauges—e.g., where strain causes deformation of a foil pattern in a manner that causes a detectable change in electrical resistance. In general, a "strain gauge" may take the form of any suitable element that has one or more detectable properties that vary with strain applied to the HMD—e.g., a change in wavelength of detected test light, or a change in detected voltage or resistance.

Accordingly, method 500 illustrates an example method 500 for alignment assessment for an HMD, in which the one or more strain gauges include a Bragg grating formed on an optical element of the HMD. Steps of method 500 may be performed by any suitable device, having any suitable capabilities, hardware configuration, and form factor. In some examples, method 500 may be implemented by head-mounted display systems 102, 400, and/or any other head-mounted display systems described herein. In some examples, steps of method 500 may be performed by computing system 1300 described below with respect to FIG. 13.

Although steps of method 500 are described in sequence, it will be understood that the steps need not be carried out sequentially. Rather, one or more steps of method 500 may be performed in parallel. In some cases, method 500 may be repeated or looped upon completion. In some cases, method 500 may be run periodically (e.g., at a predetermined frequency), and/or run in response to one or more designated triggers—e.g., a user input indicating that the displayed imagery appears misaligned.

Figure 6:
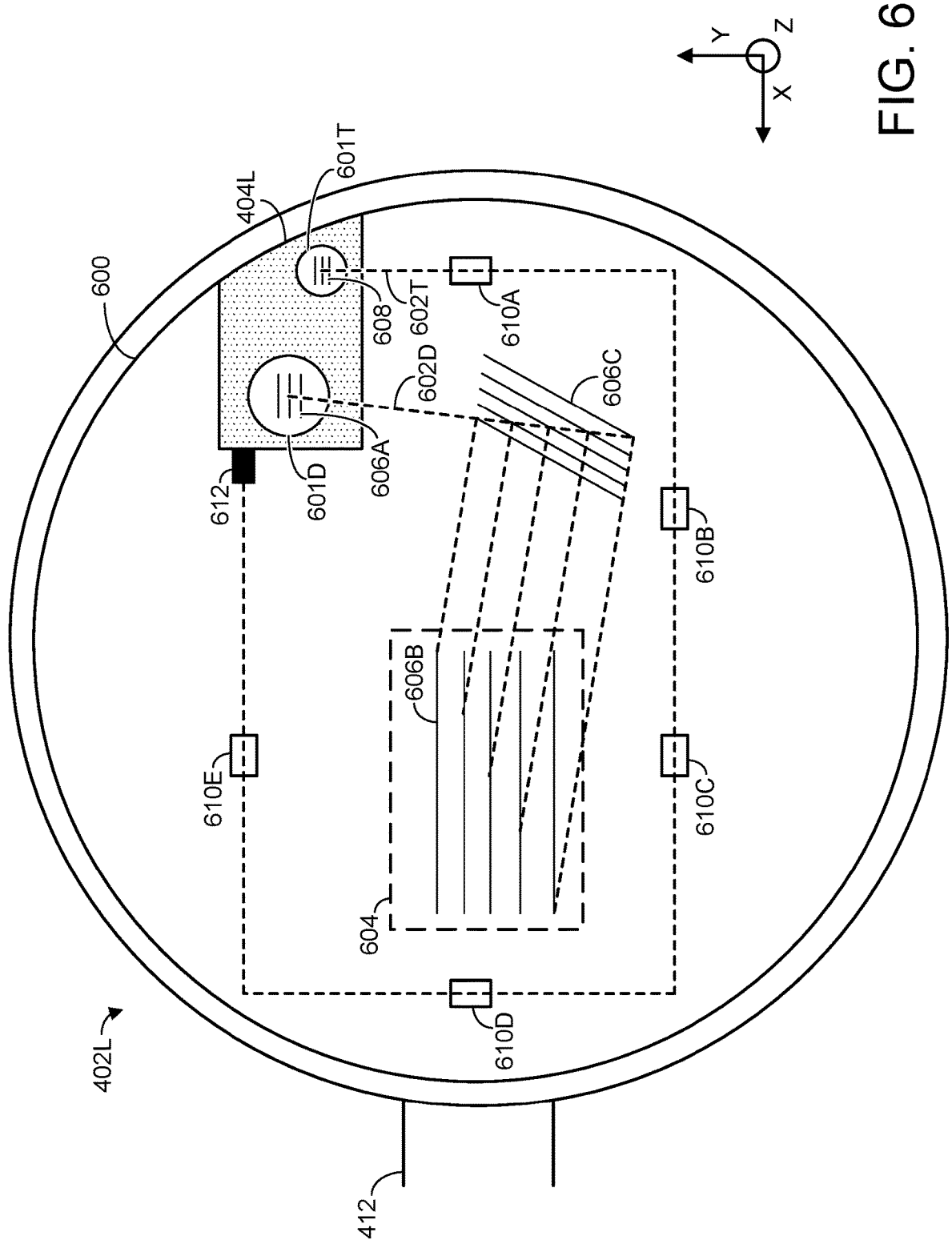
FIG. 6 schematically depicts an example display assembly of a head-mounted display system.

At 502, method 500 includes emitting test light from a test light source into an optical element configured to propagate the test light via total internal reflection. The optical element includes one or more Bragg gratings, each having variable light return parameters based at least on an amount of strain applied to the optical element. This is schematically illustrated with respect to FIG. 6, showing display assembly 402L and associated components of head-mounted display system 400 in more detail. Specifically, FIG. 6 shows display assembly 402L, light source 404L, an optical element 600, and a portion of bridge support 412 extending toward right display assembly 402R (not shown in FIG. 6).

In FIG. 6, light source 404L is configured to emit both display light 602D for forming display images, and test light 602T for assessing the alignment of components of HMD 400. To this end, the light source includes a first emitter 601D for releasing display light 602D, and a second emitter 601T for releasing test light 602T. Each "emitter" may include a pupil through which light may be emitted from the light source, and may further include one or more suitable optical elements (e.g., lenses) for focusing, collimating, and/or otherwise conditioning the emitted light.

In some cases, each light emitter may be associated with different light-generating componentry of the light source (e.g., different LCOS or MEMS displays). In such cases, properties of the test light may vary from the display light in any suitable way. For example, while the display light may often be spatially modulated to form a display image, the test light may include a broadband spectrum of wavelengths—e.g., the test light may be "white" light including substantially the entire visible light spectrum. In some cases, a brightness of the test light may differ from the display light—e.g., the test light may be less bright than the display light, as it is intended only for measurement by the test light sensor and not for viewing by a user eye. In some cases, the test light may use non-visible wavelengths of light—e.g., the test light may include infrared light.

In other examples, the test light and display light may originate from the same light-generating componentry and have substantially similar properties, although may be released along different optical paths by the light source. One example in which the test light and the display light are output by a shared light emitter of the light source will be described below with respect to FIG. 7.

In the example of FIG. 6, the source of the test light (e.g., the "test light source") is also configured to output the display light 602D for viewing by the user eye. In other words, the test light source is integrated into the display assembly. In other examples, the test light source may be separate from the display light source, and need not be integrated into a display assembly of an HMD. For example, as will be described in more detail below, the test light source may in some cases emit test light into an optical element (e.g., a fiber optic element) of the wearable frame assembly that does not propagate display light—e.g., for the purposes of assessing strain applied to the wearable frame assembly.

In the example of FIG. 6, the display light emitted by the light source is propagated by an optical element 600 for viewing at a left eyebox 604. In this example, the optical element takes the form of a waveguide (e.g., a suitable optical fiber or transparent dielectric waveguide), although it will be understood that this is non-limiting. Similarly, it will be understood that the size and position of the eyebox relative to waveguide 600 and other components depicted in FIG. 6 is non-limiting.

In some examples, incoupling and outcoupling of the display light is facilitated by suitable diffractive optical elements (DOEs) on optical element 600. In FIG. 6, optical element 600 includes a first DOE 606A for incoupling display light 602D, and a second DOE 606B for outcoupling the display light for viewing at the eyebox, represented in FIG. 6 by different sets of parallel lines on the surface of the waveguide. A diffractive optical element as described herein may take any suitable form. As one example, a DOE can include a plurality of surface relief gratings formed onto the surface of the waveguide. As light strikes the surface relief gratings, at least some of the light is refracted into or out of the waveguide, depending on the purpose of the grating. In other examples, the DOEs may take other suitable forms. For example, the DOEs can include holographic optical elements (HOEs).

Once incoupled, light may propagate within the waveguide in any suitable way. As one example, light may propagate through a waveguide via total internal reflection, where light repeatedly reflects between opposite surfaces of the waveguide until the light is outcoupled by a different DOE.

In some cases, the waveguide may include one or more additional DOEs or other optical features between the incoupling DOE and the outcoupling DOE, such as one or more expansion DOEs for expanding the left-side display light along one or more orthogonal dimensions. In the example of FIG. 6, waveguide 600 includes an expansion DOE 606C along the optical path between DOE 606A and DOE 606B. DOE 606C functions to expand the display light 602D relative to the Y axis. It will be understood that a waveguide as described herein may include any suitable number of DOEs disposed along the optical path of the display light, which may condition or affect the display light in any suitable way (e.g., expand along the Y axis and/or the X axis to increase a size of the eyebox).

Light source 404L further provides test light 602T. The test light is propagated by an optical element via total internal reflection for eventual detection by a test light sensor. In this example, the optical element configured to propagate the test light is the waveguide of the display assembly—e.g., waveguide 600. However, as will be discussed in more detail below, the test light may in some cases be propagated by a different optical element from the display light. In FIG. 6, test light 602T is incoupled to waveguide 600 by a test-light DOE 608. From there, the test light travels along a light path indicated by the dashed line extending away from test light emitter 601T of light source 404L. The light path may be defined by waveguide 600 in any suitable way—e.g., via any suitable etchings or gratings applied to the waveguide to control propagation of the test light.

Along the light path taken by the test light are positioned a plurality of Bragg gratings formed on (e.g., etched into) the optical element. As used herein, a "Bragg grating" refers to a set of individual grating elements each separated by a substantially similar distance. Different Bragg gratings of the HMD may have different element-to-element spacings, which can affect the wavelengths of light returned by the Bragg grating, as will be described in more detail below. In FIG. 6, five different sets of Bragg gratings 610A-610E are represented by rectangles positioned along the light path of the test light. However, it will be understood that an HMD as described herein may include any suitable number of Bragg gratings having variable light return properties, including only one Bragg grating (e.g., one set of individual grating elements separated by a substantially similar element-to-element spacing).

Each Bragg grating has variable light return parameters based on an amount of strain applied to the optical element. In other words, the test light source emits test light that propagates in the optical element, and the variable light return parameters of the Bragg grating cause strain-dependent return of a portion of the test light. For example, Bragg gratings return incident light falling within a relatively narrow range of wavelengths, while allowing light outside the wavelength range to continue propagating along a light path defined by the optical element. The returned range of wavelengths is defined by the spacing between the individual grating elements of the Bragg grating. As such, in cases where the test light emitted by the light source includes a broad spectrum of wavelengths (e.g., the range includes hundreds of nanometers), a relatively narrow range may be returned by the Bragg grating back toward the light source (e.g., the range includes only single-digit nanometers). Wavelengths of the test light outside the returned range continue propagating forward along the light path.

Strain applied to the optical element can change the spacing between the grating elements, thereby changing the wavelength(s) of light returned by the Bragg grating. For instance, strain applied to the optical element can bend or otherwise deform the optical element in a manner that increases or decreases the average element-to-element spacing of a Bragg grating. In other words, a particular Bragg grating may return a first wavelength of the test light for a first amount of strain applied to the optical element, and a second wavelength for a second amount of strain applied to the optical element. Furthermore, as discussed above, each Bragg grating may use a different element-to-element spacing, causing each Bragg grating to return different wavelengths of light from one another. As such, the MD may include a second Bragg grating also having variable light return parameters, but configured to return different wavelengths of the test light from the first Bragg grating. In this manner, a third wavelength of the test light may be returned by the second Bragg grating for the first amount of strain applied to the optical element, and a fourth wavelength of the test light may be returned by the second Bragg grating for the second amount of strain applied to the optical element.

Furthermore, the wavelength(s) returned by the Bragg grating(s) at any given time can be detected by a test light sensor having a suitable position along the light path defined by the optical element. In the example of FIG. 6, HMD 400 includes a test light sensor 612 configured to detect the test light in the optical element. As will be described in more detail below, the logic machine of the HMD may assess the alignment of components of the HMD based at least in part on properties of the detected test light—e.g., to detect which wavelengths are being detected for the current strain state.

Figure 7:
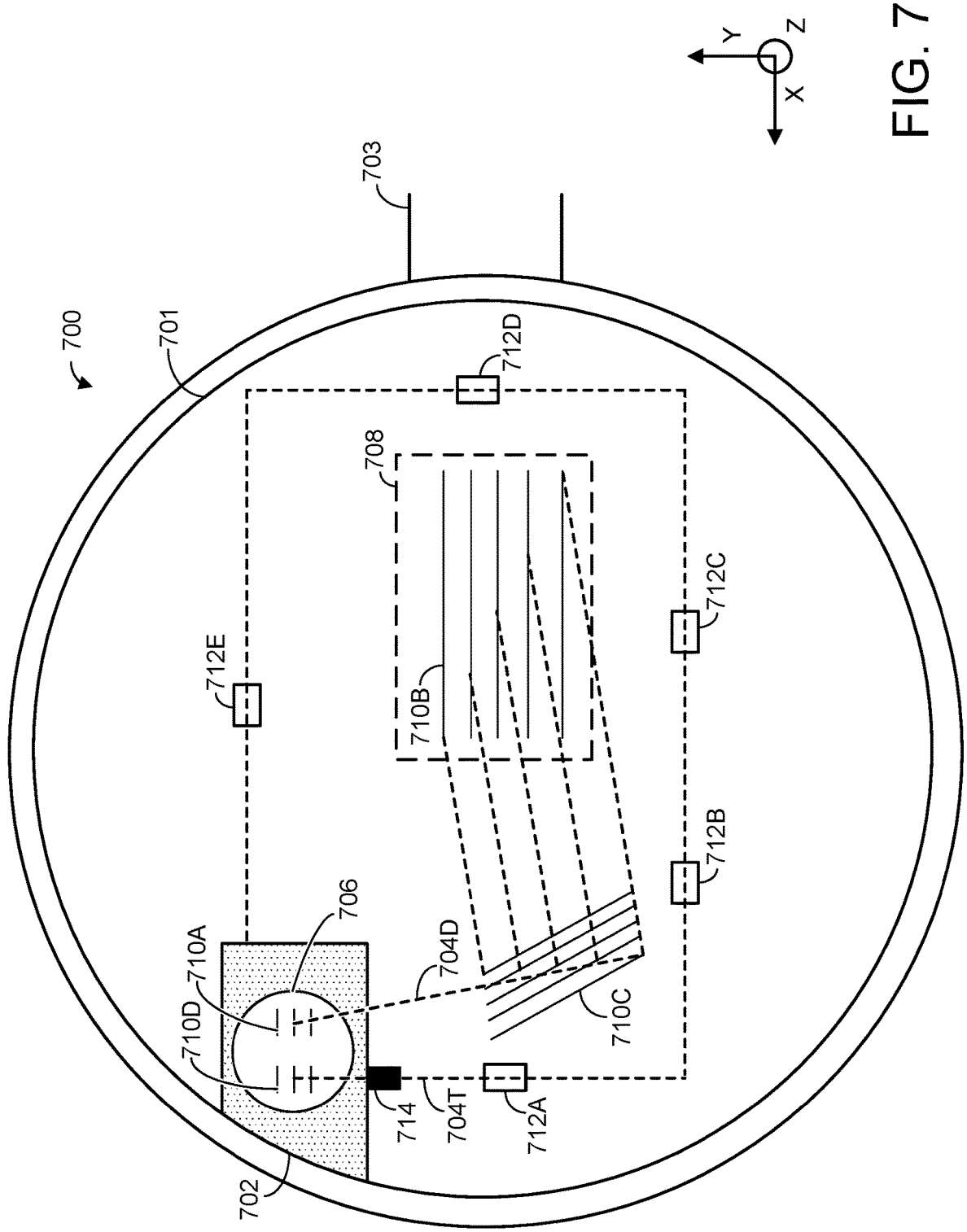
FIG. 7 schematically depicts another example display assembly of a head-mounted display system.

FIG. 6 focuses on one display assembly of HMD 400. It will be understood that the HMD may further include a second display assembly (e.g., display assembly 402R), which may have a substantially similar arrangement of components to display assembly 402L. However, as discussed above, the arrangement of components schematically depicted in FIG. 6 is only one non-limiting example. As such, FIG. 7 schematically shows another example display assembly 700 with corresponding display components having a configuration that varies from that shown in FIG. 6. Display assembly 700 includes an optical element 701 (e.g., a waveguide), a light source 702, and a bridge support 703 extending away from the display assembly. As with FIG. 6, it will be understood that the configuration shown in FIG. 7 is another non-limiting example, and that a head-mounted display system as described herein need not use the exact configurations shown in either FIG. 6 or FIG. 7.

In some examples, a head-mounted display device may include two near-eye displays with substantially similar configurations, albeit oriented symmetrically from one another. In other examples, a head-mounted display system may include near-eye displays with different configurations—e.g., one near-eye display may use a configuration similar to that of FIG. 6, while the other near-eye display uses a configuration similar to that of FIG. 7.

In FIG. 7, the head-mounted display system includes a light source 702 configured to provide display light 704D and test light 704T. Unlike light source 404L, light source 702 includes a shared emitter 706 for releasing the display light and the test light. However, as discussed above, a light source may alternatively include separate emitters for releasing the test light and display light, or the HMD may include separate light sources for emitting display and test light.

In cases where a shared emitter is used, the test light may in some cases be a subset of the display light. In other words, both the display light and test light may in some cases originate from the same light-generating componentry within the light source. In the example of FIG. 7, separate DOEs are used for incoupling the display light and test light to the waveguide, although this need not always be the case. In some examples, the display assembly may provide more light than is needed to form a display image, and the extra light may be used as the test light. In some cases, the test light may include residual display light that is not outcoupled by the waveguide at the eyebox. In some cases, the display light may be released with some non-visible wavelengths, and the non-visible wavelengths may be measured as test light—e.g., the test light can include infrared light. As another example, when a shared pupil is used, the display light and test light can be separated temporally—e.g., on some time frames, display light may be released for viewing by a user eye, while on other time frames, test light is released for measurement by the optical sensor.

Similar to optical element 600, optical element 701 takes the form of a waveguide configured to incouple the display light from the light source, and outcouple the display light for viewing at an eyebox 708. This may be achieved via suitable DOEs as described above—waveguide 701 includes a first DOE 710A that incouples display light 704D to the waveguide, and a second DOE 710B that outcouples the display light for viewing at eyebox 708. The waveguide may further include one or more expansion DOEs along the optical path between the incoupling and outcoupling DOEs for expanding the display light along one or more orthogonal dimensions. In the example of FIG. 7, right waveguide 700 includes an expansion DOE 710C that expands the display light along the Y axis.

Waveguide 701 is further configured to propagate the test light 704T emitted by the light source. To this end, waveguide 701 includes a test-light DOE 710D configured to incouple the test light. From there, the test light follows a light path defined by the waveguide, and represented by the dashed line extending away from light source 702 from test-light DOE 710D. As with waveguide 600, waveguide 701 includes a plurality of Bragg gratings 712A-712E positioned along the light path taken by the test light. As described above, each Bragg grating may have variable light-return parameters (e.g., returning different wavelengths of the test light for different strain states).

FIG. 7 also schematically depicts a test light sensor 714 configured to detect the test light in the optical element. In contrast to test light sensor 612 of FIG. 6, test light sensor 714 is positioned at a source-proximal end of the light path of the test light. As will be described in more detail below, the position of a test light sensor along a light path may affect the manner in which wavelengths of the test light are used to assess the alignment of components of the HMD.

Figure 5:
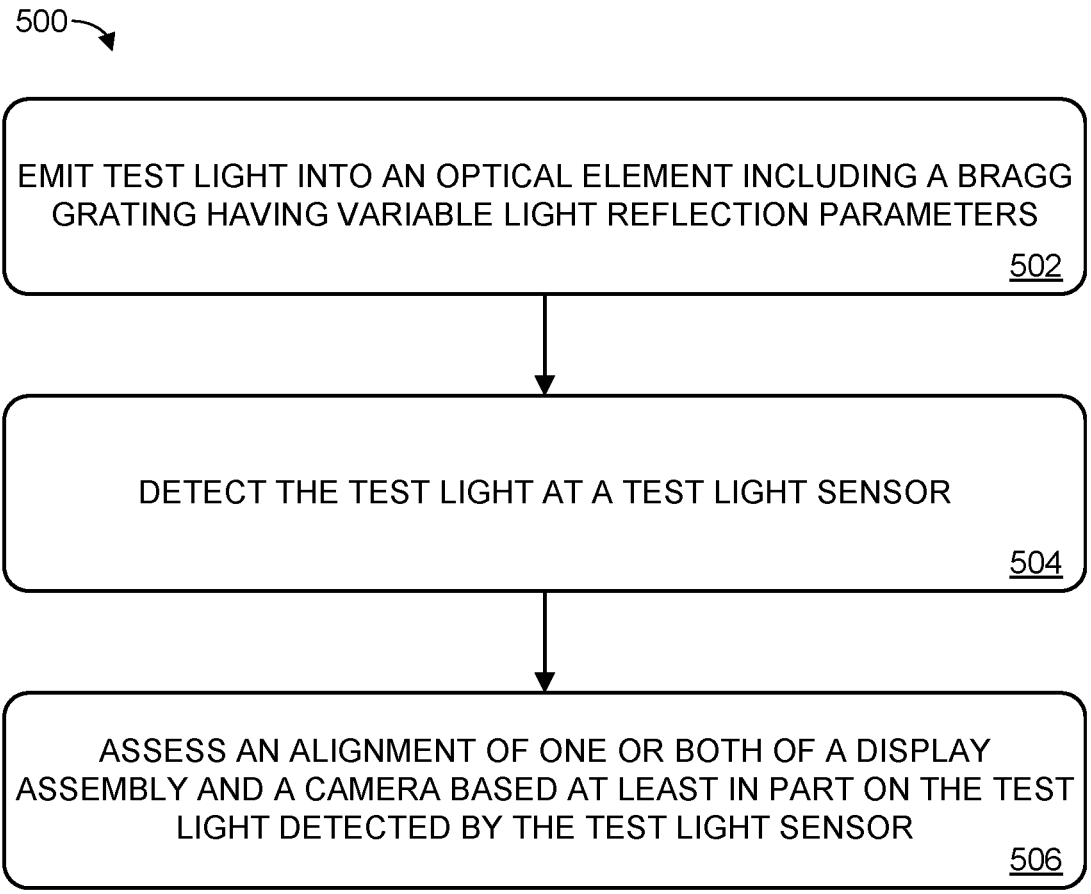
FIG. 5 illustrates an example method for alignment assessment for a head-mounted display system.

Returning briefly to FIG. 5, at 504, method 500 includes detecting the test light in the optical element at a test light sensor. For example, as discussed above, FIG. 6 shows an example test light sensor 612, and FIG. 7 shows an example test light sensor 714, each of which may be useable to detect test light propagating in their respective optical elements.

Figure 8A:
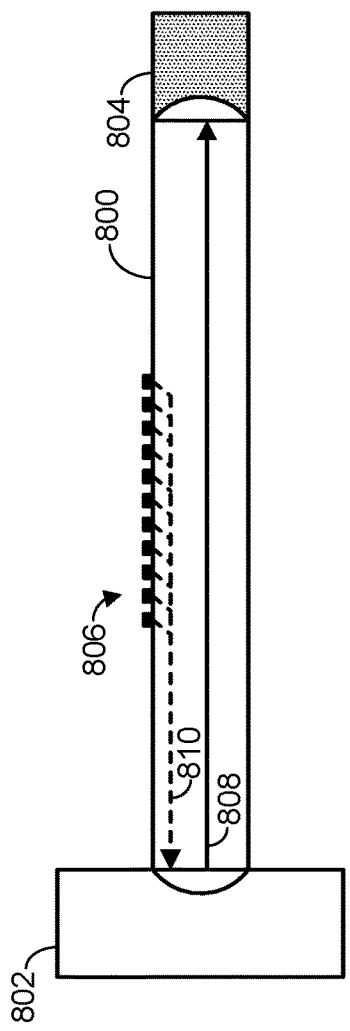

Detecting test light in the optical element may include detecting wavelengths of the test light at the test light sensor. This is schematically illustrated with respect to FIGS. 8A-8D. FIG. 8A schematically shows an example optical element 800, which may take the form of a waveguide (e.g., waveguides 600 or 701), or a fiber optic element as non-limiting examples. Optical element 800 is coupled to a test light source 802 configured to emit test light into the optical element, and a test light sensor 804 configured to detect the test light from the optical element. Furthermore, a Bragg grating 806 is formed on the optical element between the test light source and the test light sensor, represented as a plurality of individual grating elements disposed on the side of the optical element.

It will be understood that the arrangement depicted in FIG. 8A, along with the arrangements shown in FIGS. 8C, 9A, 10A, and 10C are highly simplified for the sake of illustration. As discussed above, an optical element, light source, and test light sensor may each take a variety of suitable forms, and may have any suitable spatial relationships with respect to one another.

In FIG. 8A, test light source emits test light 808, which propagates through the optical element toward test light sensor 804. The test light is represented as a straight arrow extending through the optical element, although it will be understood that this is done only for the sake of visual clarity. Rather, as discussed above, test light may propagate through an optical element in any suitable way, such as via total internal reflection—where the test light is repeatedly reflected between opposing surfaces of the optical element. It will be understood that the test light propagates through the optical element in a manner that causes return of a portion 810 of the test light by Bragg grating 806, represented in FIG. 8A by the dashed arrow extending toward the light source from the Bragg grating.

As discussed above, the portion of the test light returned by the Bragg grating may represent a relatively narrow range of wavelengths relative to the test light—e.g., a wavelength range of a few nanometers may be returned, while other wavelengths of the test light continue propagating in the optical element. This return of a portion of the test light by the Bragg grating may be detectable by the test light sensor, as is illustrated in FIG. 8B.

Figure 8B:
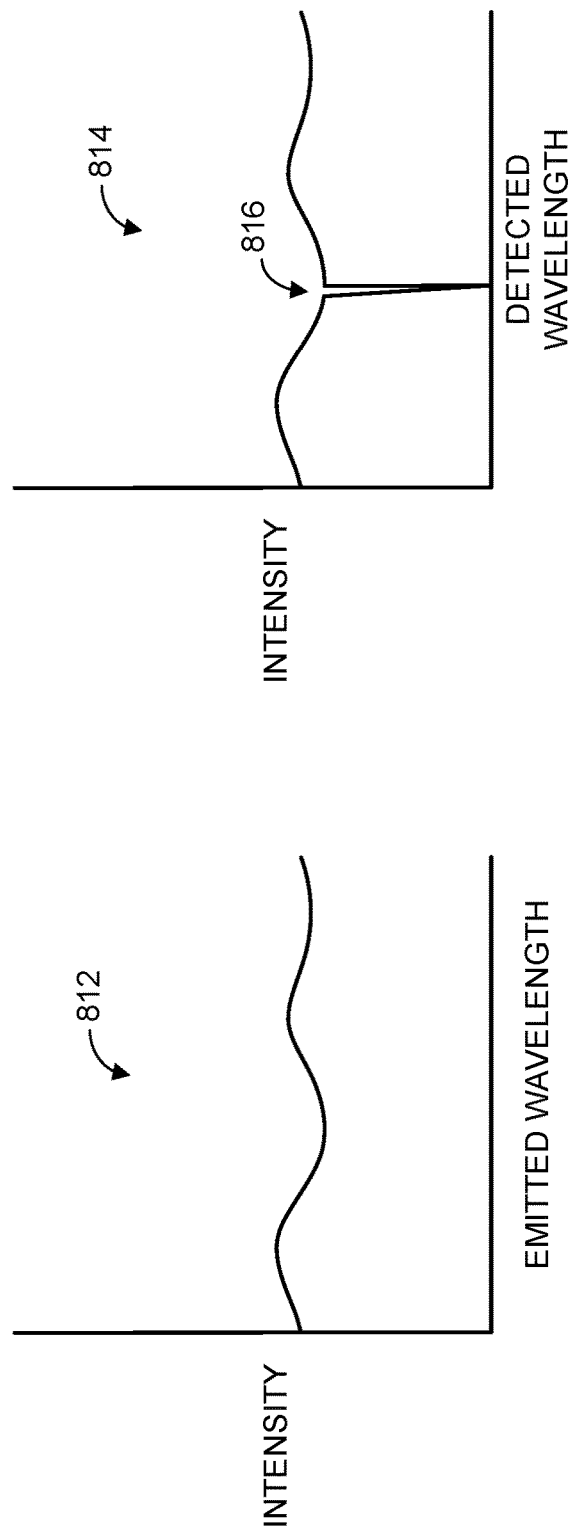

Specifically, FIG. 8B includes a first plot 812, representing the relative intensities of a spectrum of wavelengths emitted by test light source 802. This may include, for example, broad-spectrum "white" light, including substantially the entire visible light spectrum. It will be understood, however, that the emitted test light can include any suitable set of wavelengths of test light. FIG. 8B also includes a second plot 814, representing the relative intensities of various wavelengths of the test light detected by test light sensor 804. As shown, plot 814 includes a wavelength valley 816, representing a relatively smaller range of wavelengths that were returned by Bragg grating 806. Because the test light sensor is positioned at a source-distal end of the light path of the test light, the wavelengths returned by the Bragg grating do not reach the test light sensor, and thus cause wavelength valley 816 in the spectrum of detected wavelengths.

It will be understood that the Bragg grating need not return all of the test light falling within the returned wavelength range. Rather, in some cases, at least some of the test light falling within the returned wavelength range may ultimately reach the test light sensor rather than be returned by the Bragg grating. Rather, it will be understood that a significant portion (e.g., at least 50%) of the test light falling in the returned wavelength range may be returned, enabling detection of the detected wavelengths for a given strain state.

Returning briefly to FIG. 5, at 506, method 500 includes assessing an alignment of one or both of a display assembly of the head-mounted display system and a camera of the head-mounted display system based at least in part on the test light detected by the test light sensor. As discussed above, the logic machine may be configured to assess the alignment of one or both of the display assembly and the camera based at least in part on wavelengths of the test light detected by the test light sensor.

For example, FIG. 8C again shows optical element 800 of FIG. 8A. In this example, strain 818 is applied to the optical element. The strain can be caused by application of external force directly to the optical element (e.g., caused by a user touching the optical element), and/or improper fitting of an HMD to a user's head, as non-limiting examples. Additionally, or alternatively, the strain may be transmitted to the optical element by other components of the HMD—e.g., flexing of a wearable frame assembly of the HMD may apply strain to the optical element.

In any case, the strain applied to the optical element affects the element-to-element spacing of the individual grating elements of Bragg grating 806. This affects the wavelengths of test light returned by the Bragg grating. In other words, the variable light return parameters of the Bragg grating cause strain-dependent return of a first wavelength of the test light for a first amount of strain applied to the Bragg grating (e.g., as is shown in FIG. 8A), and a second wavelength of the test light for a second amount of strain applied to the optical element (e.g., as is shown in FIG. 8C).

This is detectable by the test light sensor, as is illustrated in FIG. 8D. Specifically, FIG. 8D includes a plot 820 showing the relative intensities of wavelengths of the test light detected by test light sensor 804 for the scenario depicted in FIG. 8C. As discussed above, test light sensor 804 is positioned at the source-distal end of the light path of the test light, and thus the returned wavelengths are indicated by a wavelength valley 822 in the detected wavelength spectrum. Marker 824 indicates the position of wavelength valley 816 detected for the scenario depicted in FIG. 8A—e.g., the expected position of the wavelength valley for the strain condition depicted in FIG. 8A. In other words, application of strain to the optical element has shifted the detected wavelength valley from marker 824 to wavelength valley 822 shown in FIG. 8D.

In this manner, the logic machine may detect when strain is applied to the optical element by comparing the wavelength(s) of light that the Bragg grating is returning at a given moment to the wavelength(s) of light known to be returned by the Bragg grating for a known strain state (e.g., corresponding to a previously calibrated alignment state). In other words, when the test light sensor is positioned at a source-distal end of a light path of the test light, the logic machine can detect a wavelength valley relative to a known a spectrum of wavelengths emitted by the test light source, where the wavelength valley is caused by the strain-dependent return of the portion of the test light by the Bragg grating. For instance, the logic machine may compare the wavelength at which wavelength valley 822 is detected, to the wavelength at which wavelength valley 816 was detected (e.g., wavelength valley 816 may be a known wavelength returned by the Bragg grating for a calibrated alignment state).

This can be used to assess the alignment of different portions of the HMD. For example, prior testing may be used to determine the wavelengths of test light returned by different Bragg gratings for different strain conditions applied to the HMD. As one example, this can include examining how the wavelengths of returned light change as the frame of the HMD is flexed in a manner that affects display assembly alignment by a known amount. Thus, at runtime, the logic machine can assess the alignment of the display assembly by detecting that a change in the returned wavelengths of test light is consistent with the wavelengths returned during testing, when the alignment of the display assembly was changed by the known amount. For example, prior testing may reveal that the wavelength corresponding to wavelength valley 822 is returned when the display assembly is bent relative to the rest of the HMD by approximately 5° in a known direction. Thus, at runtime, the logic machine may assess the alignment of the display assembly as a misalignment of 5° when a wavelength valley is detected at the position of valley 822. A wavelength valley detected at a different wavelength may be consistent with a different previously-tested condition, such as misalignment of the camera.

It will be understood that such testing may enable virtually any strain condition applied to the HMD to be detected, particularly when multiple Bragg gratings are formed on one or more different optical elements of the HMD. For instance, flexing, bending, or otherwise manipulating the HMD in any number of different ways will likely cause application of strain to the one or more optical elements of the HMD, which therefore affects the wavelengths of test light returned by the various Bragg gratings formed on the optical elements. During testing, the wavelengths of test light returned by different Bragg gratings may, for instance, be stored in a look-up table that can be consulted by the HMD during runtime. For example, the HMD is bent in a controlled manner, and the wavelengths of test light returned by the Bragg gratings may be stored in the look-up table, along with information specifying the controlled bend of the HMD.

In this manner, the logic machine may detect various misalignments of the HMD at run-time by consulting the look-up table. In other words, upon detecting a particular wavelength of detected test light corresponding to a particular Bragg grating, the HMD may consult the lookup table to compare the detected wavelength to a known wavelength returned by the Bragg grating for a known strain state of the HMD. For example, the detected wavelength may correspond to a specific misalignment of the HMD camera.

However, it will be understood that a look-up table is only one non-limiting example, and that a wavelength of returned test light may be correlated to a given alignment of one or more components of the HMD in other suitable ways. As another example, the HMD may use a set of heuristics to relate different returned wavelengths of test light to different strain states of the HMD, and/or use a suitable pre-trained algorithm via suitable machine learning (ML) and/or artificial intelligence (AI) techniques.

FIG. 9A schematically depicts another example optical element 900, where two Bragg gratings are used. Specifically, optical element 900 is coupled to a light emitter 902 and a test light sensor 904. Two different Bragg gratings 906A and 906B are formed on the optical element, and are each configured to return different portions of test light 908 emitted by the test light source. As shown, Bragg grating 906A returns a first portion 910A of the test light (e.g., corresponding to one range of wavelengths) and Bragg grating 906B returns a second portion 910B of the test light (e.g., corresponding to a different range of wavelengths).

Furthermore, in FIG. 9A, strain 912 is applied to the optical element, which affects the wavelengths of the test light returned by the Bragg gratings. For example, as discussed above, Bragg grating 906A may be configured to return a first wavelength for a first strain state (e.g., no strain applied), and a second wavelength for a second strain state (e.g., strain 912 applied). Similarly, Bragg grating 906B may be configured to return a third wavelength for the first strain state, and a fourth wavelength for the second strain state.

This is illustrated with respect to FIG. 9B, showing a plot 914 of the relative intensities of wavelengths of the test light detected by test light sensor 904 for the scenario depicted in FIG. 9A. As shown, the detected wavelengths include two wavelength valleys 916A and 916B, corresponding to the wavelengths of the test light returned by the Bragg gratings when strain 912 is applied. These wavelength valleys are shown relative to markers 918A and 918B, which correspond to the positions of wavelength valleys consistent with a different strain state—e.g., a previously-calibrated alignment. As discussed above, the logic machine of the HMD may assess an alignment of the HMD based at least in part on the wavelengths at which the wavelength valleys are detected.

Furthermore, it will be understood that using two different Bragg gratings is non-limiting, and that an HMD may include any suitable number of different optical elements configured to propagate test light, each including any suitable number of different Bragg gratings. For example, the waveguides shown in FIGS. 6 and 7 each include five different Bragg gratings, each of which may be configured to return different wavelengths of light from one another for different strain states applied to the HMD. In some cases, the positions of the different Bragg gratings with respect to a particular optical element and the overall HMD may be carefully selected to increase the sensitivity to different types of misalignments that can occur—e.g., such that strain applied along different vectors and/or to different specific components affects different Bragg gratings in a characteristic and replicable manner.

The present disclosure has thus far primarily focused on scenarios where the test light sensor is positioned at a source-distal end of the light path of the test light, and thus the wavelengths returned by a Bragg grating are indicated by wavelength valleys relative to the known spectrum of emitted wavelengths. In other examples, however, the test light sensor may be positioned at a source-proximal end of the light path of the test light. One example of this scenario is shown in FIG. 7, in which test light sensor 714 is positioned at the source-proximal end of the light path taken by test light 704T.

Figure 10A:
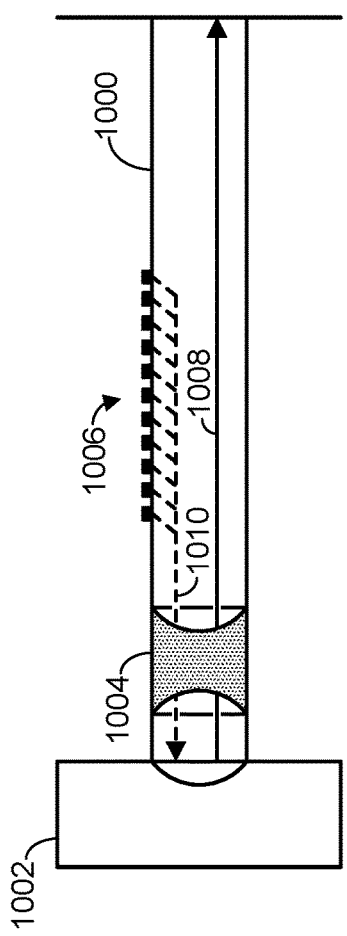
FIGS. 10A-D schematically illustrate return of a portion of test light by a Bragg grating of an optical element.

Such an arrangement will now be described in more detail with respect to FIGS. 10A-10D. Specifically, FIG. 10A shows an example optical element 1000, coupled to a test light source 1002. FIG. 10A also shows a test light sensor 1004, which in this example takes the form of an "in-line" test light sensor positioned in close proximity to test light source 1002. Optical element 1000 includes a Bragg grating 1006, configured to return a portion of test light 1008 emitted by the test light source. Specifically, Bragg grating 1006 returns a portion 1010 of the test light.

Notably, the returned portion of the test light passes back through the test light sensor on its return path to the test light source, as the test light sensor is positioned at a source-proximal end of the light path of the test light. This may cause the returned wavelengths of the test light to be detected with a relatively higher intensity by the test light sensor than would be the case if the Bragg grating was not present. In other words, test light falling within the range of wavelengths returned by the Bragg grating is returned both when it is outbound from the test light source, as well as when it is inbound from the Bragg grating.

Figure 10B:
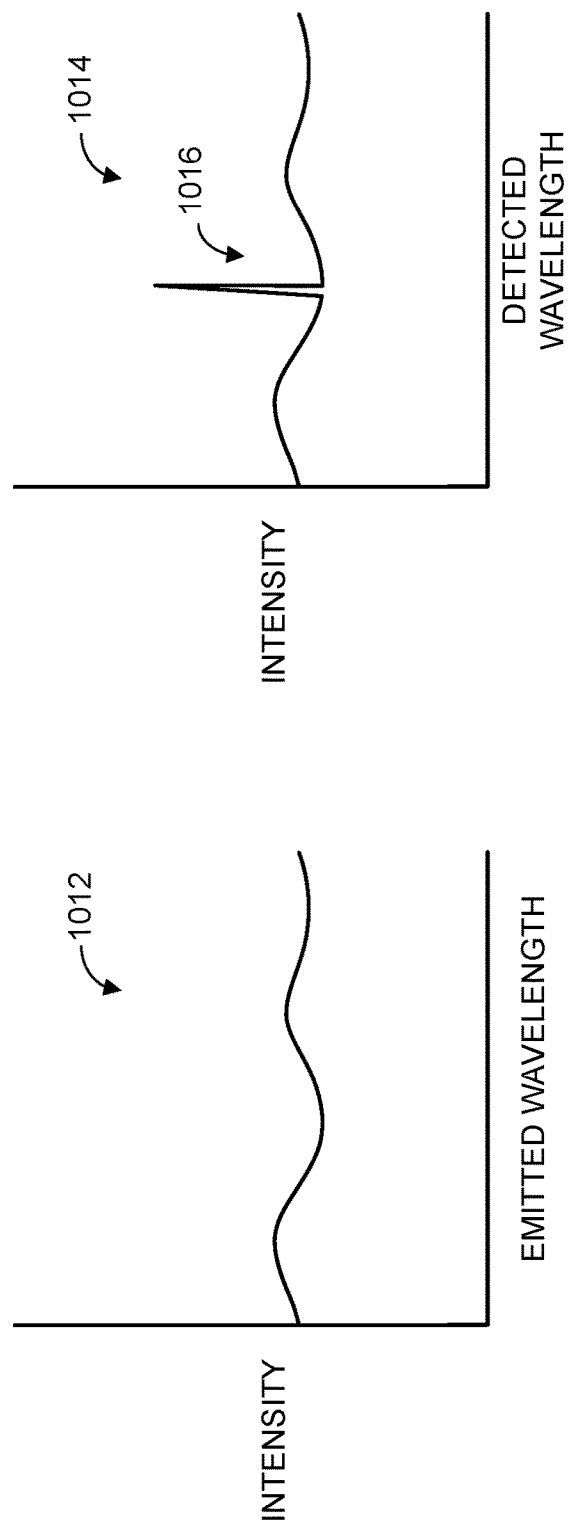

This is illustrated with respect to FIG. 10B, showing a plot 1012 of the relative intensities of the wavelengths of test light emitted by the test light source. Another plot 1014 shows the relative intensities of wavelengths of the test light detected by the test light sensor for the scenario depicted in FIG. 10A. As shown, the detected wavelengths include a wavelength peak 1016, corresponding to the wavelengths of the test light returned by the Bragg grating for the given strain state.

In this manner, the logic machine may be configured to assess the alignment of one or both of the display assembly and the camera based at least in part on detecting a wavelength peak caused by the strain-dependent return of the portion of the test light by the Bragg grating. For example, the logic machine may assess the alignment of one or both of the display assembly and the camera by comparing a wavelength at which the wavelength peak is detected to a known wavelength returned by the Bragg grating for a known strain state of the head-mounted display system.

Figure 10C:
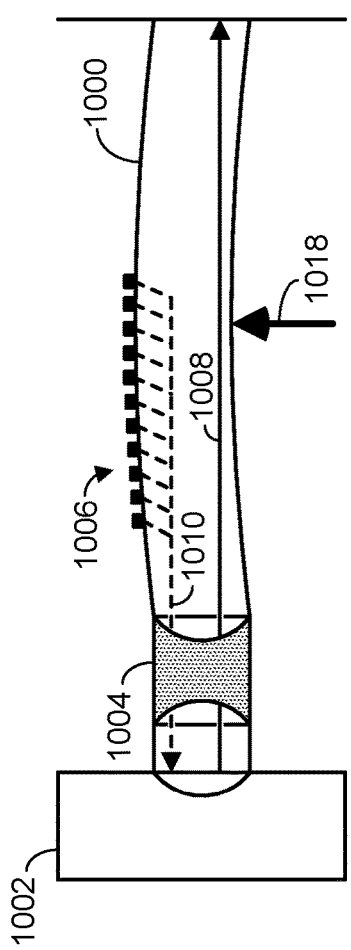
Figure 10D:
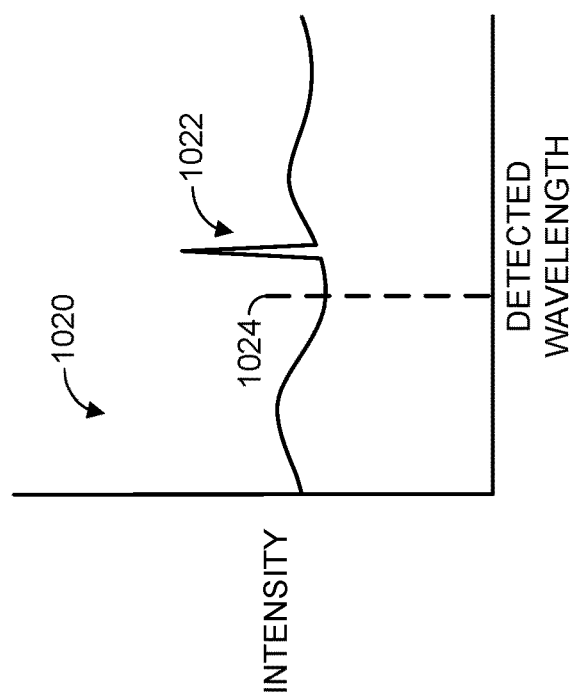

This is schematically illustrated with respect to FIGS. 10C and 10D. FIG. 10C again shows optical element 1000, although in this case strain 1018 is applied, which affects the wavelength of the test light returned by Bragg grating 1006. This is represented in FIG. 10D, showing a plot 1020 of the relative intensities of wavelengths of the test light detected by test light sensor 1004 for the scenario depicted in FIG. 10C. As shown, plot 1020 includes a wavelength peak 1022, corresponding to the wavelength of the test light returned by Bragg grating 1006 when strain 1018 is applied. This is shown relative to marker 1024, indicating the wavelength at which wavelength peak 1016 was detected for the prior strain state—e.g., the previously-calibrated alignment.

The present disclosure has thus far focused primarily on examples where the optical element used to propagate the test light toward the test light sensor is also integrated into the display assembly, and thus is used to propagate the display light toward the eyebox for viewing by a user eye. However, it will be understood that this need not always be the case. Rather, in some examples, one or both of the test light source and optical element may be separate from the display assembly—e.g., they may be used to assess the alignment of other components of the HMD.

Figure 11:
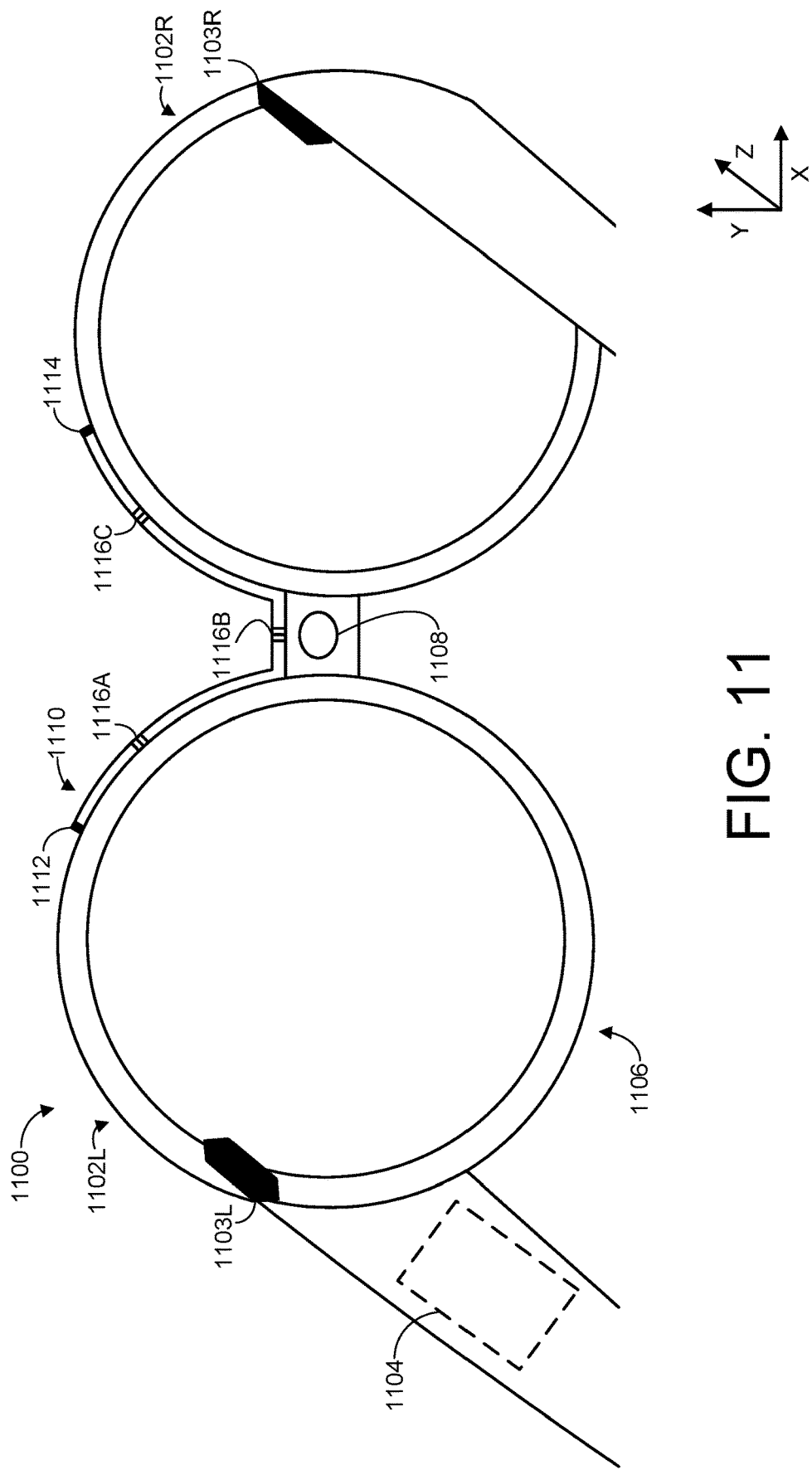
FIG. 11 schematically depicts another example head-mounted display system including an optical element coupled to a wearable frame assembly.

This is schematically illustrated with respect to FIG. 11, showing portions of an example HMD 1100. Similar to HMD 400, HMD 1100 includes respective left and right display assemblies 1102L and 1102R. Each display assembly includes a respective display light source 1103L/1103R, configured to provide display light for viewing by a user eye. HMD 1100 further includes a logic machine 1004, wearable frame assembly 1106, and world-facing camera 1108.

Additionally, as compared to HMD 400, HMD 1100 includes an optical element 1110 coupled to the wearable frame assembly. Optical element 1110 may, as one example, take the form of a fiber optic element coupled to the wearable frame assembly in any suitable way—e.g., via a suitable adhesive such as an epoxy. Additionally, or alternatively, the fiber optic element may be integrated within the HMD—e.g., embedded within the wearable frame assembly. Optical element 1110 is coupled to a test light source 1112 and a test light sensor 1114. Optical element 1110 also includes several different Bragg gratings 1116A-1116C. Thus, as discussed above, portions of test light emitted by the test light source may be returned by the Bragg gratings before the test light is detected at the test light sensor. Strain applied to the optical element may affect the wavelengths of test light returned by the different Bragg gratings, which is detectable by the test light sensor.

In this manner, the logic machine may assess the alignment of different components of the HMD—e.g., camera 1108, display assembly 1102L, and/or display assembly 1102R. For example, different types of strain applied to HMD 1100 (e.g., different amounts of strain, applied along different vectors, applied to different components, and/or having different sources) may affect the behavior of the different Bragg gratings in different ways, depending on how the strain applied to the optical element affects the element-to-element spacing for each Bragg grating. Thus, different misalignments of the HMD may be associated with characteristic profiles, each profile associated with the different wavelengths of the test light returned by the different Bragg gratings for that misalignment. Such profiles may in some cases be developed through prior testing as described above—e.g., via a factory calibration routine and/or an end-user calibration routine.

It will be understood that the specific arrangement shown in FIG. 11 is a non-limiting example. In particular, an optical element configured to propagate test light from a test light source may have any suitable size, shape, and appearance, and may be coupled to any suitable portion of an HMD.

Furthermore, as discussed above, an HMD may include any suitable number of different test light sources, each configured to emit test light into any suitable number of different optical elements. For example, an HMD having two display assemblies may in some cases include only one test light source and corresponding optical element configured to propagate the test light, and these may be integrated into either of the display assemblies, or neither of the display assemblies (e.g., as is shown in FIG. 11). In such cases, the logic machine may be configured to assess an alignment of both of the first and second display assemblies based at least in part on the test light detected by the test light sensor (e.g., the positions of wavelength valleys/peaks in a wavelength spectrum of the detected test light).

As another example, an HMD having two display assemblies may in some cases include two different test light sources—e.g., a first test light source and a second test light source. These may be configured to output test light into respective first and second optical elements, each including one or more respective Bragg gratings having variable light return parameters. For example, as is shown in FIG. 6, the test light sources and optical elements may be integrated into the two display assemblies of the HMD. In such cases, the logic machine may be configured to assess the alignment the first display assembly, the second display assembly, the camera, and/or any other suitable components of the HMD based on test light detected by first and second test light sensors, corresponding to the first and second test light sources.

As discussed above, misalignments of an HMD can interfere with presentation of display images to a user's eyes—e.g., causing left- and right-side display images to appear to have an incorrect position, orientation, and/or size with respect to a real-world environment and/or one another. To this end, in some cases, the logic machine may be configured to dynamically vary one or both of a display position and a display orientation of the display image based at least in part on the alignment of one or both of the display assembly and the camera, assessed as described above.

Figure 12:
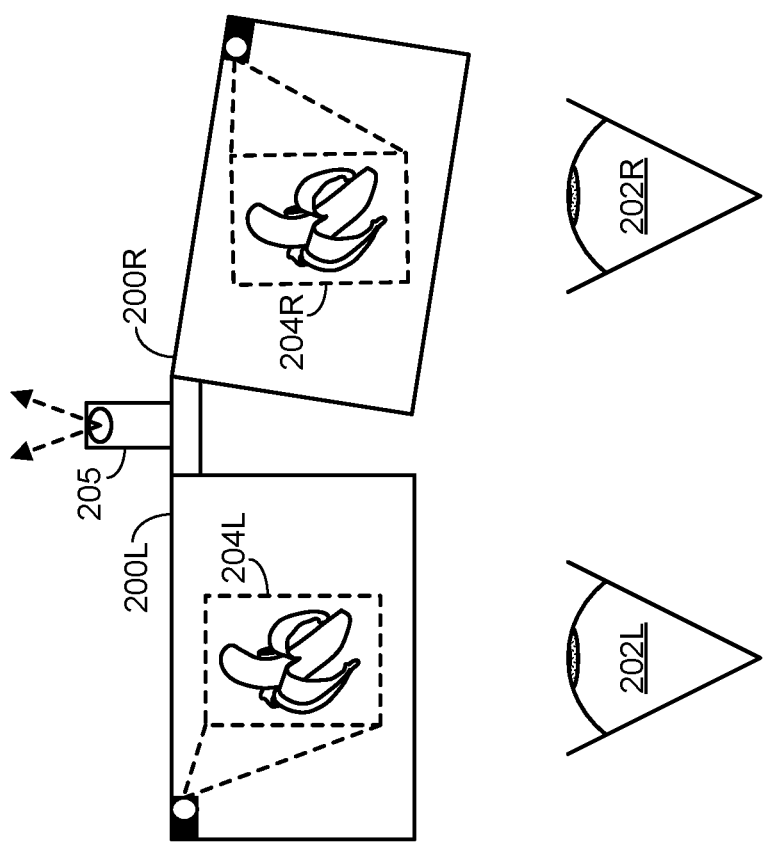
FIG. 12 schematically illustrates varying aspects of a display image based on an alignment of a display assembly.

This is schematically illustrated with respect to FIG. 12, again showing left and right near-eye displays 200L and 200R of FIG. 2. In this example, right near-eye display 200R is misaligned relative to left near-eye display 200L, which would ordinarily cause a misalignment between left and right display images 204L and 204R. However, in this example, the logic machine of the head-mounted display system is adjusting the display light used to form right display image 204R to preserve stereo alignment with the left display image. In a different scenario, the logic machine may additionally or alternatively adjust the left-side display light.

Such adjustment may be done in any suitable way. In some cases, adjusting the display light can include adjusting the display space angle of the image displayed by the display assembly. As another example, the display assembly may include one or more steerable mirrors that direct the display light out of the pupil of the display assembly, and by controlling the orientation of the one or more steerable mirrors, the angle of the display light entering the waveguide may be adjusted—e.g., to counteract a detected misalignment in the head-mounted display system.

As another example, the logic machine may be configured to improve the stereo alignment by horizontally and/or vertically shifting or rotating one or both of a left display image of the left-side display light and a right display image of the right-side display light. This may be done in image space and/or in display space. For example, the display light may be controlled to change a two-dimensional position at which the display image is visible relative to the surface of the waveguide—e.g., to preserve alignment between the display image and a user eye, even when components of the head-mounted display system are misaligned. Additionally, or alternatively, the spatial modulation of the display light may be changed, such that different pixels are used to form the image, without changing the angle or path of the display light.

Additionally, or alternatively, the logic machine may present a notification to a user upon detecting a misalignment. In this manner, regardless of whether the logic machine takes any action to adjust the display light and improve the stereo alignment, the user may be notified that components of the head-mounted display system appear to be misaligned—e.g., due to bending or flexing of a frame of the system. Thus, the user may take manual action to alleviate the misalignment.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 13:
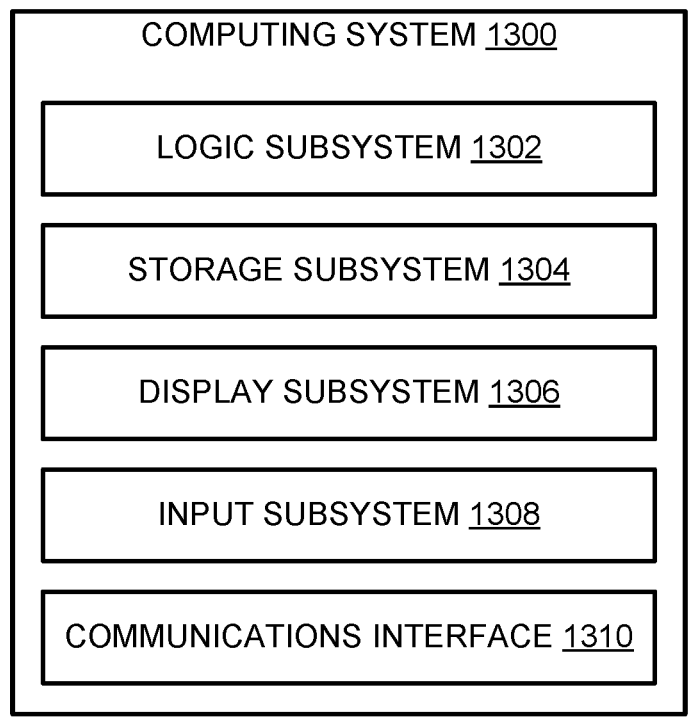
FIG. 13 schematically shows an example computing system.

FIG. 13 schematically shows a simplified representation of a computing system 1300 configured to provide any to all of the compute functionality described herein. Computing system 1300 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 1300 includes a logic subsystem 1302 and a storage subsystem 1304. Computing system 1300 may optionally include a display subsystem 1306, input subsystem 1308, communication subsystem 1310, and/or other subsystems not shown in FIG. 13.

Logic subsystem 1302 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 1304 includes one or more physical devices configured to temporarily and/or permanently hold computer information such as data and instructions executable by the logic subsystem. When the storage subsystem includes two or more devices, the devices may be collocated and/or remotely located. Storage subsystem 1304 may include volatile, nonvolatile, dynamic, static, read/write, read-only, random-access, sequential-access, location-addressable, file-addressable, and/or content-addressable devices. Storage subsystem 1304 may include removable and/or built-in devices. When the logic subsystem executes instructions, the state of storage subsystem 1304 may be transformed—e.g., to hold different data.

Aspects of logic subsystem 1302 and storage subsystem 1304 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 1306 may be used to present a visual representation of data held by storage subsystem 1304. This visual representation may take the form of a graphical user interface (GUI). Display subsystem 1306 may include one or more display devices utilizing virtually any type of technology. In some implementations, display subsystem may include one or more virtual-, augmented-, or mixed reality displays.

When included, input subsystem 1308 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 1310 may be configured to communicatively couple computing system 1300 with one or more other computing devices. Communication subsystem 1310 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a head-mounted display system comprises: a wearable frame assembly; a display assembly mounted to the wearable frame assembly and configured to provide display light for viewing by a user eye; a camera mounted to the wearable frame assembly and configured to image a surrounding real-world environment; a test light source configured to output test light into an optical element configured to propagate the test light via total internal reflection, the optical element including a Bragg grating having variable light return parameters based at least on an amount of strain applied to the optical element; a test light sensor configured to detect the test light; and a logic machine configured to assess an alignment of one or both of the display assembly and the camera based at least in part on the test light detected by the test light sensor. In this example or any other example, the variable light return parameters of the Bragg grating cause strain-dependent return of a portion of the test light, such that a first wavelength of the test light is returned by the Bragg grating for a first amount of strain applied to the optical element, and a second wavelength of the test light is returned by the Bragg grating for a second amount of strain applied to the optical element. In this example or any other example, the head-mounted display system further comprises a second Bragg grating having variable light return parameters, such that a third wavelength of the test light is returned by the second Bragg grating for the first amount of strain applied to the optical element, and a fourth wavelength of the test light is returned by the second Bragg grating for the second amount of strain applied to the optical element. In this example or any other example, the logic machine is configured to assess the alignment of one or both of the display assembly and the camera based at least in part on wavelengths of the test light detected by the test light sensor. In this example or any other example, the test light sensor is positioned at a source-distal end of a light path of the test light, and the logic machine is configured to assess the alignment of one or both of the display assembly and the camera based at least in part on detecting a wavelength intensity valley relative to a known a spectrum of wavelengths emitted by the test light source, the wavelength intensity valley caused by the strain-dependent return of the portion of the test light by the Bragg grating. In this example or any other example, the logic machine is configured to assess the alignment of one or both of the display assembly and the camera by comparing a wavelength at which the wavelength intensity valley is detected to a known wavelength of the test light returned by the Bragg grating for a calibrated alignment between the display assembly and the camera. In this example or any other example, the test light sensor is positioned at a source-proximal end of a light path of the test light, and the logic machine is configured to assess the alignment of one or both of the display assembly and the camera based at least in part on detecting a wavelength intensity peak caused by the strain-dependent return of the portion of the test light by the Bragg grating. In this example or any other example, the logic machine is configured to assess the alignment of one or both of the display assembly and the camera by comparing a wavelength at which the wavelength intensity peak is detected to a known wavelength of the test light returned by the Bragg grating for a calibrated alignment between the display assembly and the camera. In this example or any other example, the display assembly includes a waveguide configured to propagate the display light from a display light source to an eyebox for viewing by the user eye, and wherein the optical element configured to propagate the test light is the waveguide of the display assembly. In this example or any other example, the optical element is a fiber optic element of the wearable frame assembly. In this example or any other example, the display light forms a display image for viewing by the user eye, and wherein the logic machine dynamically varies one or both of a display position and a display orientation of the display image based at least in part on the alignment of one or both of the display assembly and the camera. In this example or any other example, the test light source is integrated into the display assembly and is further configured to output the display light. In this example or any other example, the test light and the display light are output by a shared light emitter of the test light source. In this example or any other example, the display assembly is a first display assembly, and the head-mounted display system further comprises a second display assembly configured to provide display light for viewing by a second user eye. In this example or any other example, the logic machine is further configured to assess an alignment of the second display assembly based at least in part on the test light detected by the test light sensor. In this example or any other example, the head-mounted display system further comprises: a second test light source configured to output test light into a second optical element, the second optical element including a second Bragg grating having variable light return parameters based at least on an amount of strain applied to the second optical element; and a second test light sensor configured to detect the test light in the second optical element, wherein the logic machine is further configured to assess an alignment of the second display based at least in part on the test light detected by the second test light sensor.

In an example, a method for alignment assessment for a head-mounted display system comprises: emitting test light from a test light source into an optical element configured to propagate the test light via total internal reflection, the optical element including a Bragg grating having variable light return parameters based at least on an amount of strain applied to the optical element; detecting the test light at a test light sensor; and assessing an alignment of one or both of a display assembly of the head-mounted display system and a camera of the head-mounted display system based at least in part on the test light detected by the test light sensor. In this example or any other example, the variable light return parameters of the Bragg grating cause strain-dependent return of a portion of the test light, such that a first wavelength of the test light is returned by the Bragg grating for a first amount of strain applied to the optical element, and a second wavelength of the test light is returned by the Bragg grating for a second amount of strain applied to the optical element. In this example or any other example, the optical element is further includes a second Bragg grating having variable light return parameters, such that a third wavelength of the test light is returned by the second Bragg grating for the first amount of strain applied to the optical element, and a fourth wavelength of the test light is returned by the second Bragg grating for the second amount of strain applied to the optical element.

In an example, a head-mounted display system comprises: a wearable frame assembly; a display assembly mounted to the wearable frame assembly and configured to provide display light for viewing by a user eye; a camera mounted to the wearable frame assembly and configured to image a surrounding real-world environment; one or more strain gauges, each strain gauge having one or more variable strain parameters based at least in part on an amount of strain applied to the head-mounted display system; and a logic machine configured to assess an alignment of one or both of the display assembly and the camera based at least in part on the one or more strain parameters for each strain gauge of the one or more strain gauges.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or parameters disclosed herein, as well as any and all equivalents thereof.

The invention claimed is:

1. A head-mounted display system, comprising:
a wearable frame assembly;
a display assembly mounted to the wearable frame assembly and configured to provide display light for viewing by a user eye;
a camera mounted to the wearable frame assembly and configured to image a surrounding real-world environment;
a test light source configured to output test light into an optical element configured to propagate the test light via total internal reflection, the optical element including a Bragg grating having variable light return parameters based at least on an amount of strain applied to the optical element, wherein the test light source is integrated into the display assembly, such that the display assembly emits the display light and the test light;
a test light sensor configured to detect the test light; and a logic machine configured to assess an alignment of one or both of the display assembly and the camera based at least in part on the test light detected by the test light sensor.

2. The head-mounted display system of claim 1, wherein the variable light return parameters of the Bragg grating cause strain-dependent return of a portion of the test light, such that a first wavelength of the test light is returned by the Bragg grating for a first amount of strain applied to the optical element, and a second wavelength of the test light is returned by the Bragg grating for a second amount of strain applied to the optical element.

3. The head-mounted display system of claim 2, further comprising a second Bragg grating having variable light return parameters, such that a third wavelength of the test light is returned by the second Bragg grating for the first amount of strain applied to the optical element, and a fourth wavelength of the test light is returned by the second Bragg grating for the second amount of strain applied to the optical element.

4. The head-mounted display system of claim 2, wherein the logic machine is configured to assess the alignment of one or both of the display assembly and the camera based at least in part on wavelengths of the test light detected by the test light sensor.

5. The head-mounted display system of claim 4, wherein the test light sensor is positioned at a source-distal end of a light path of the test light, and the logic machine is configured to assess the alignment of one or both of the display assembly and the camera based at least in part on detecting a wavelength intensity valley relative to a known spectrum of wavelengths emitted by the test light source, the wavelength intensity valley caused by the strain-dependent return of the portion of the test light by the Bragg grating.

6. The head-mounted display system of claim 5, wherein the logic machine is configured to assess the alignment of one or both of the display assembly and the camera by comparing a wavelength at which the wavelength intensity valley is detected to a known wavelength of the test light returned by the Bragg grating for a calibrated alignment between the display assembly and the camera.

7. The head-mounted display system of claim 2, wherein the test light sensor is positioned at a source-proximal end of a light path of the test light, and the logic machine is configured to assess the alignment of one or both of the display assembly and the camera based at least in part on detecting a wavelength intensity peak caused by the strain-dependent return of the portion of the test light by the Bragg grating.

8. The head-mounted display system of claim 7, wherein the logic machine is configured to assess the alignment of one or both of the display assembly and the camera by comparing a wavelength at which the wavelength intensity peak is detected to a known wavelength of the test light returned by the Bragg grating for a calibrated alignment between the display assembly and the camera.

9. The head-mounted display system of claim 1, wherein the display assembly includes a waveguide configured to propagate the display light from a display light source to an eyebox for viewing by the user eye, and wherein the optical element configured to propagate the test light is the waveguide of the display assembly.

10. The head-mounted display system of claim 1, wherein the optical element is a fiber optic element of the wearable frame assembly.

11. The head-mounted display system of claim 1, wherein the display light forms a display image for viewing by the user eye, and wherein the logic machine dynamically varies one or both of a display position and a display orientation of the display image based at least in part on the alignment of one or both of the display assembly and the camera.

12. The head-mounted display system of claim 1, wherein the test light and the display light are output by a shared light emitter of the test light source.

13. The head-mounted display system of claim 1, wherein the display assembly is a first display assembly, and the head-mounted display system further comprises a second display assembly configured to provide display light for viewing by a second user eye.

14. The head-mounted display system of claim 13, wherein the logic machine is further configured to assess an alignment of the second display assembly based at least in part on the test light detected by the test light sensor.

15. The head-mounted display system of claim 13, further comprising:
a second test light source configured to output test light into a second optical element, the second optical element including a second Bragg grating having variable light return parameters based at least on an amount of strain applied to the second optical element; and
a second test light sensor configured to detect the test light in the second optical element, wherein the logic machine is further configured to assess an alignment of the second display based at least in part on the test light detected by the second test light sensor.

16. A method for alignment assessment for a head-mounted display system, the method comprising:
emitting test light from a test light source into a waveguide configured to propagate the test light via total internal reflection, the waveguide including a Bragg grating having variable light return parameters based at least on an amount of strain applied to the waveguide, wherein the waveguide is further configured to propagate display light from a display light source to an eyebox for viewing by a user eye;
detecting the test light at a test light sensor; and
assessing an alignment of one or both of a display assembly of the head-mounted display system and a camera of the head-mounted display system based at least in part on the test light detected by the test light sensor.

17. The method of claim 16, wherein the variable light return parameters of the Bragg grating cause strain-dependent return of a portion of the test light, such that a first wavelength of the test light is returned by the Bragg grating for a first amount of strain applied to the waveguide, and a second wavelength of the test light is returned by the Bragg grating for a second amount of strain applied to the waveguide.

18. The method of claim 17, wherein the waveguide further includes a second Bragg grating having variable light return parameters, such that a third wavelength of the test light is returned by the second Bragg grating for the first amount of strain applied to the waveguide, and a fourth wavelength of the test light is returned by the second Bragg grating for the second amount of strain applied to the waveguide.

19. A head-mounted display system, comprising:
a wearable frame assembly;
a display assembly mounted to the wearable frame assembly and configured to provide display light for viewing by a user eye;

a camera mounted to the wearable frame assembly and configured to image a surrounding real-world environment;

a test light sensor configured to detect test light emitted by a test light source and propagated by an optical element, wherein the optical element includes a Bragg grating having variable light return parameters based at least on an amount of strain applied to the optical element, wherein the test light sensor is positioned at a source-distal end of a light path of the test light; and a logic machine configured to assess an alignment of one or both of the display assembly and the camera based at least in part on detecting a wavelength intensity valley relative to a known spectrum of wavelengths emitted by the test light source, the wavelength intensity valley caused by the variable light return parameters of the Bragg grating.

20. The head-mounted display system of claim 19, wherein the logic machine is further configured to assess the alignment of one or both of the display assembly and the camera by comparing a wavelength at which the wavelength intensity valley is detected to a known wavelength of the test light returned by the Bragg grating for a calibrated alignment between the display assembly and the camera.

* * * * *